United States Patent
Krumm et al.

(10) Patent No.: US 6,839,027 B2
(45) Date of Patent: Jan. 4, 2005

(54) LOCATION MEASUREMENT PROCESS FOR RADIO-FREQUENCY BADGES EMPLOYING PATH CONSTRAINTS

(75) Inventors: John Krumm, Redmond, WA (US); Gregory Smith, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 59 days.

(21) Appl. No.: 10/295,935

(22) Filed: Nov. 15, 2002

(65) Prior Publication Data

US 2004/0095276 A1 May 20, 2004

(51) Int. Cl.[7] .................................................. G01S 3/02
(52) U.S. Cl. ....................................................... 342/465
(58) Field of Search ................................. 342/465, 463

(56) References Cited

U.S. PATENT DOCUMENTS

| | | | | |
|---|---|---|---|---|
| 6,140,964 A | * | 10/2000 | Sugiura et al. | 342/464 |
| 6,269,246 B1 | * | 7/2001 | Rao et al. | 455/456.3 |
| 6,393,294 B1 | * | 5/2002 | Perez-Breva et al. | 455/456.5 |
| 2003/0184475 A1 | * | 10/2003 | Williams et al. | 342/465 |

OTHER PUBLICATIONS

Prasithsangaree, P. et al, "On Indoor Position Location with Wireless LANS," 13th IEEE International Symposium Personal, Indoor and Mobile Radio Communication (PIMRC) Sep. 2002, pp. 720–724, vol. 2.*

Chen, Yongguang et al, "Signal Strength Based Indoor Geolocation," IEEE International Conf on Communications, Apr. 2002, pp. 436–439.*

Wallbaum, Michael, "WHEREMOPS: An Indoor Geolocation System," 13th IEEE International Symposium on Personal, Indoorand Mobile Radio Communications (PIMRC) Sep. 2002, pp. 1967–1971, vol. 4.*

(List continued on next page.)

*Primary Examiner*—Gregory C. Issing
(74) *Attorney, Agent, or Firm*—Lyon & Harr, LLP; Richard T. Lyon

(57) ABSTRACT

A process for measuring the location of people and objects carrying radio frequency (RF) transmitters (TXs) that transmit messages to a plurality of RF receivers (RXs) located in a space. Each RX is in communication with a computer of a computer network and forwards data received from the TXs to the network via its associated computer, along with a value indicating the signal strength of the received TX transmission. The signal strengths attributable to the same transmission are used to form a locating signal strength vector which is then compared to exemplary vectors generated from signal strength readings gathered in a calibration procedure from a set of representative locations in the space. In comparing the locating vector to the exemplary vectors, constraints are enforced on movements between locations (e.g., cannot pass through walls) and to probabilistically enforce expectations on transitions between locations.

23 Claims, 8 Drawing Sheets

OTHER PUBLICATIONS

Pahlavan, Kaveh et al, "Indoor Geolocation Science and Technology," IEEE Communications Magazine, Feb. 2002, pp. 112–118.*

Bahl, P. and V. N. Padmanabhan. Radar: An In–Building RF–based User Location and Tracking System. In IEEE INFOCOM 2000. 2000. Tel–Aviv, Israel. MCS Research.

Bahl, P. , V. N. Padmanabhan and A. Balachandran, Enhancements to the RADAR User Location and tracking System, MSR–TR–2000–12, 2000.

Castro, P., et al. A Probabilistic Room Location Service for wireless Networked environments, In Ubicomp 2001. 2001. Atlanta, GA, USA: Springer.

Hightower, J., G. Borriello, and R. Want, SpotOn: An Indoor 3D Location Sensing Technology based on RF Signal Strength, UW–CSE Feb. 2, 2002, University of Washington, 2000.

Rabiner, L.R., A Tutorial on Hidden Markov Models and Selected Applications in Speech Recognition. Proceedings of the IEEE, 1989. 77(2):p. 257–285.

* cited by examiner

LOCATION MEASUREMENT PROCESS FOR RADIO-FREQUENCY BADGES EMPLOYING PATH CONSTRAINTS

BACKGROUND

1. Technical Field

The invention is related to RF-based location tracking systems, and more particularly to a process employed in such systems for determining the location of persons and objects carrying radio frequency (RF) transmitters that transmit data messages to a plurality of RF receivers connected to a computer in a computer network. The receivers forward data received from the transmitters to the network, along with radio signal strength indicator (RSSI) data, for computation of the location of the person or object carrying each transmitter.

2. Background Art

Knowledge of the indoor location of people and objects is widely considered to be a key enabler to the viability of many current mobile and ubiquitous computing schemes. These applications include location-sensitive messaging, location-based reminders, and activity inferencing, among others. For example, in a mobile computing environment, a user of a mobile computing device (e.g., notebook computer, handheld PC, palm-size PC, Personal Digital Assistant (PDA) or mobile phone) may wish the device to provide directions to a particular location in a building, such as the nearest printer, snack room, restroom, etc., or perhaps directions to a particular conference room or office within the building. This type of information is dependent on knowing the current location of the user. Mobile computing device users also typically expect messages and other notification information to be provided to them wherever they happen to be. However, some notifications can be dependent upon the user's location. For instance, a user might be notified that he or she is near a printer where a user-submitted document has been printed. Again the user's current location is needed to make such a notification. A mobile computing device user might also want to know the location of other people in the building, in order to find them or obtain information about them. For example, a user might want to get a list of the names of people attending the same meeting. To obtain this information, it is necessary to know what people are at the location of the meeting. The foregoing are just a few examples of the need to know the location of people. It is easy to imagine many other situations where knowledge of the location of people would be useful.

Location information is equally critical in so-called ubiquitous computing. Ubiquitous computing revolves around extending computational activities beyond the current desktop model and into the environment. In future homes and offices, access to computing should be as natural as access to lighting. Users should not be required to go to a special place (i.e., the desktop) to interact with the computer. Rather, the computer should be available to interface with the user anywhere in the home or office (or more generally anywhere in an arbitrarily large environment), through whatever set of devices is available, be they fixed or carried by the user.

It is noted that the term computer is used loosely here in that the user actually would have access to a wide variety of computing and information services, which will likely employ many computers and "smart" devices such as the aforementioned PDA's, mobile phones, etc. For example, computing services such as web browsing, document editing, or video conferencing are envisioned. Thus, it should be understood that when the term computer is used in connection with the concept of ubiquitous computing, in actuality many computers may be involved non-exclusively in a single interactive session.

The usefulness of a ubiquitous computing system hinges on the ability to maintain an awareness of the users, particularly their locations. One goal of such a system would then be to understand the physical and functional relationship between the users and various I/O devices. This knowledge could be employed to allow a user to move from room to room while still maintaining an interactive session with the computer. In addition, knowledge about whom and what is in the vicinity of a person can be used to tailor a person's environment or computing session to behave in a context-sensitive manner. For example, knowing the location of a person in a building can be used to infer what activity that person is engaged in and then the environment or computing session can be adjusted appropriately.

While the location of static things such as furniture, big displays, and desktop computers can reasonably be measured manually, the locations of things that move, including people, demand automatic measurement. The Global Positioning System works well outdoors, but there is not yet a comparably ubiquitous and inexpensive technology for measuring location indoors. Even so, there are several current technologies for automatically determining the location of people and objects in indoor spaces. For example, one of the first of such location systems uses diffuse infrared technology to determine the location of people and objects in an indoor environment. A small infrared emitting badge (sometimes referred to as a button or tag) is worn by each person, or attached to each object, whose location is to be tracked. The badge automatically emits an infrared signal containing a unique identifier every 10 seconds, or upon request of a central server. These requests are transmitted to the badges via a series of fixed infrared sensors placed throughout the indoor environment—typically mounted to the ceiling. The sensors also receive the infrared emissions from badges within their line-of-sight. The central server, which is hardwired to each sensor, collects the data received by the sensors from the badges and provides it to a location program for processing. These types of systems do not provide the actual 3D location of the person or object carrying the badge. Rather, the person's or object's location is deemed to be within the room or area containing the infrared sensor that received the emission from the badge attached to the person or object. In addition, these systems, being infrared-based, are susceptible to interference from spurious infrared emissions from such sources as fluorescent lighting or direct sunlight. Further, diffuse infrared-based systems have a limited range, typically only several meters. Thus, except in small rooms, multiple sensors are required to cover the area. In addition, since the sensors must be within the line-of-sight of the badges, a sensor must be placed in every space within a room that cannot be seen from other parts of the room. As a result, a considerable number of sensors have to be installed and hardwired to the central server. This infrastructure can be quite expensive and in some cases cost prohibitive.

Other existing indoor location systems attempt to improve the accuracy of the location process using a combination of radio frequency and ultrasonic emission. In these systems, a central controller sends a request for location data via a short range radio transmission to each badge worn by the people, or attached to the objects, whose location is being tracked. In response, the badges emit an ultrasonic pulse to a grid of fixed receivers, which are typically mounted to the ceiling.

Each receiver that "hears" the ultrasonic pulse emitted from a badge reports its distance from the badge to the central controller via hardwired connections. Specifically, a synchronized reset signal is sent to each receiver at the same time the location request is transmitted to the badges. This reset signal starts a timing procedure that measures the time between the reset signal and the receipt of an ultrasonic pulse for a badge within range of the receiver. The receiver then computes its distance from the badge emitting the pulse and reports this to the central controller. An ultrasound time-of-flight lateration technique is then used by the controller to accurately determine the locations of the badges. While these types of systems do provide very accurate location information, they again require an expensive infrastructure in form of multiple receivers mounted throughout the environment which must be hardwired to the central controller. In addition, the accuracy of these systems has been found to be adversely affected if the placement of the receivers is less than optimal. Further, there is a concern associated with animals being sensitive to ultrasonic emissions.

A variation of the combined radio frequency and ultrasonic location system requires the badges to determine their own location, presumably to compute directions, and the like, and to provide the information to a person carrying the badge. In this case there is no centralized controller that determines locations of all the badges. Specifically, ultrasonic emitters are mounted in various locations around an indoor space. The badges include a radio frequency transceiver. Whenever location information is desired, the badge transmits a radio frequency signal. The emitters pick up the signal from the badges and respond with an ultrasonic pulse. The badge unit measures the time it takes to receive each ultrasonic pulse emitted by an emitter within range of the badge. In addition to the ultrasonic pulse, the emitters also transmit a radio frequency signal that identifies the emitter and its location. From the timing and emitter location information, the badge triangulates its own position. The infrastructure is not as problematic in this latter system since there can be fewer emitters and they are not hardwired into any kind of centralized controller. However, only the badge unit knows its location. Thus, there is no centralized database to provide location information to help locate persons in the building. In addition, the badges are relatively complex in that they must include both a radio frequency transceiver and an ultrasonic receiver, as well as the processing capability (and so power burden) to compute their location.

In yet another indoor location system [2], radio frequency LAN wireless networking technology is used to determine the position of people, or more specifically a computing device employing the wireless LAN technology (such as a notebook computer). In this system, base stations are deployed within the indoor environment to measure the signal strength and signal to noise ratio of signals transmitted by the wireless LAN devices (or vice versa where the mobile computer receive signals transmitted by the fixed-location base stations and measure the signal strength and signal to noise ratio thereof. A centralized program takes the signal information and employs a lateration process to estimate the location of the transmitting unit. More particularly, the location estimation process involves using signal strength in a nearest neighbor analysis among the base stations, and employs a rudimentary Viterbi-like algorithm [4] to help smooth trajectories. This system has the advantages of requiring only a few base stations and using the same infrastructure that provides the building's general purpose wireless networking. However, the person or object being tracked must have a device capable of supporting a wireless LAN, which may be impractical on small or power constrained devices.

The Nibble [5] system also uses wireless LAN signals to compute locations in a building. It uses the measured signal-to-noise ratio instead of absolute signal strength. Nibble is based on a Bayesian network to compute the probability of being at any of a set of discrete locations in the building. Nibble's Bayesian network also supports the inclusion of transition probabilities between nodes.

Other current systems also employ radio frequency technology to locate people and objects in an indoor environment. One such system uses a centralized base station and a series of antennas spread throughout the environment that each emit a RF request signal which is received by badges within range of the antenna. These badges, which are attached to people and objects whose location is being tracked, transmit a RF signal in reply with an identifying code embedded therein. The location of the badge relative each antenna is computed using a measurement of the time it takes for the base station to receive the reply via the various antennas after the request is transmitted. However, the antennas have a narrow cone of influence, which can make ubiquitous deployment prohibitively expensive.

In another RF based system, users approaching a PC are automatically logged on by virtue of their wearing a badge transmitting RF. The receiver connects to the PC via RS-232. Although this system was not designed to measure location in a building, Hightower et al.[1] investigated its use for location measuring in a room. They measured 3D location based on multiple receivers and an empirically derived function giving signal strength as a function of distance to the receiver. The hardware limited signal strength measurements to two bits, which in turn limited the system's resolution to a cube of three meters on a side. In addition, it took 10 to 20 seconds to gather readings from all the receivers into the central database for the computation of a single 3D location.

Electromagnetic sensing is also employed for position tracking. These types of systems generate axial DC magnetic field pulses from a fixed antenna. The system then computes the position of the receiving antennas by measuring the response in three orthogonal axes to the transmitted field pulse. However, the infrastructure needed for these systems is expensive and the tracked object must be tethered to a control unit.

Finally, position tracking has been accomplished using computer vision techniques. In these systems, cameras are employed to determine where persons or objects of interest are located in an indoor environment. While these types of position tracking systems can be quite accurate, the processing required to analyze each camera frame is substantial, especially when complex scenes are involved. Thus, the infrastructure costs for these systems can be very high.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a process for determining the location of persons and objects in an environment that overcomes the limitations of existing location systems. Generally, the location measurement process is implemented in a RF-based location tracking system in which signal strength data is captured. One particularly applicable system consists of a plurality of small RF transmitters that transmit information packets to multiple receivers. Each transmission packet contains at a minimum an ID number of the transmitter. The transmitter includes uses a PIC microcontroller to read and control the functions of among other things a tilt switch, the transmitter itself, and four outside buttons. The tilt switch is used to shut off the transmitter after a prescribed period of inactivity and to turn it on again when it moves, thus saving battery power. The four outside buttons are used to turn on the transmitter, turn off the transmitter, put the transmitter in a periodic transmit mode, and trigger a one-time transmission. When the transmissions are either periodic or triggered by the one-time transmit button, the transmitted message is annotated with a special value indicating that the transmission was triggered by a button and not activity. The receivers are each small boxes with connections for DC power and RS-232. A 15 cm antenna is employed to receive transmissions. Each transmission from a transmitter is demodulated by a receiver chip which also generates a digital radio signal strength indicator (RSSI). The transmission data and RSSI are sent to a serial communications chip which forwards the data out the RS-232 port to a host PC. On each host PC there is a logging program listening to the receiver. Upon receipt of a transmission record from the receiver, this program appends the name of the PC and the name of the RS-232 port to the data record and forwards it to a SQL Server database on a centralized computer. This centralized computer collects such records from all receiver PCs. To avoid clock synchronization issues on the PCs, the central PC is responsible for appending a time stamp to each incoming record.

The present location measurement process uses the aforementioned database to estimate the location of a person or object carrying one of the transmitters. More particularly the process uses the signal strengths captured from each receiver that are attributable to the same transmission to form a signal strength vector which is then employed to estimate the person's or object's location. Instead of trying to analytically model signal strength as a function of location, exemplary signal strength readings are gathered in a calibration procedure from a set of discrete locations in the space. These locations are chosen to represent places a person or object is likely to be in the space. The readings are used to form calibration vectors that are assigned to one of the representative locations.

The procedure for capturing calibration data to form the calibration vectors involves respectively placing one of the aforementioned transmitters at each of the representative locations in the space. A person performing the calibration procedure (i.e., the calibrator) employs a portable computer that is in communication with the centralized computer (such as via a wireless network connection) to send a message indicating that the transmitter has been placed at one of the representative locations and provides the predefined name of the location. The centralized computer then captures the calibration data provided from the RXs each time the TX transmits from the indicated representative location. During this period, the calibrator continuously reorients the transmitter while remaining at the location. This reorientation task is meant to mimic the different orientation the transmitter might be found in when being carried at the location by a person or object of interest. All the calibration data collected is associated by the centralized computer with the representative location undergoing calibration. Once the calibrator finishes the reorientation task, he or she sends a message to the centralized computer indicating that the transmitter is being removed from the currently indicated representative location. In response, the centralized computer ceases to associate any data received with the currently indicated location. This process is then repeated for all the remaining representative locations that have not yet been calibrated. The calibration vectors are generated by combining the signal strength readings extracted from the receiver messages that are attributable to the same transmitter transmission.

Once the space has been calibrated, it is possible to measure the location of a person or object carrying one of the aforementioned transmitters. Essentially, a "live" signal strength vector is generated from the receiver messages sent in response to a transmission from the transmitter. This live signal strength vector is compared to the sets of calibration signal strength vectors to find a likely location for a person or object that is carrying the transmitter. In making this determination, the person or object is deemed to be at one of the representative locations. Further, the person's or object's movement since the last location computation is deemed to be confined to a path representing feasible connections between these representative locations. Thus, a location requiring the person or object to have moved through an obstruction such as a wall, or to an impossibly remote position in the space, in the time between transmissions (e.g., 1 second), is not considered. This path constraint scheme is implemented with the use of transition probabilities. Essentially, the probability that a person or object of interest in the space would remain at the same location, and the respective probabilities that the person or object would move to each of the other representative locations, in the time between TX transmissions, is established for each representative location. For those transitions between representative locations that are deemed not to be allowable due to distance or an obstruction, the transition probability is set to zero. This path data is combined with the signal strength data in an HMM and the Viterbi algorithm is employed to compute the most likely path.

More specifically, a locating quantity is defined and used as a basis to perform the aforementioned comparison. The locating quantity is initially defined as the product of the probability of starting at a representative location under consideration and the probability of measuring at that location the most current locating signal strength vector generated based on a comparison to the calibration signal strength vectors associated with the location. Upon the generation of the first live locating signal strength vector, the locating quantity for each representative location is computed, and the coordinates of the representative location associated with the maximum locating quantity computed is designated as the current location of the person or object carrying the TX whose transmission was responsible for the locating signal strength vector under consideration. Then, upon generation of each subsequent locating signal strength vector, the locating quantity for each representative location, which is now defined as the maximum value of the respective products of the locating quantity computed for the immediately preceding locating signal strength vector generated for each representative location multiplied by the transition probability of transitioning from that location to the representative location under consideration multiplied by the probability of measuring the current locating signal strength vector at that representative location, is computed. Again, the representative location associated with the maximum locating quantity value is designated as the current location of the person or object of interest. Note that the locating quantity computed for each locating signal strength vector generated after the first employs the locating quantity computed for the preceding vector. In this way the locating quantity computed for each vector generated is influenced by every locating quantity computed in previous iterations. Thus, instead of just looking at current readings, all previous readings back to the beginning are considered. For efficiency, the algorithm can limit the number of previous readings used in the computation of the current location.

It is noted that the procedure used to compute the probability of measuring the most current locating signal strength vector generated at a particular representative location based on the calibration signal strength vectors generated for that location in the foregoing process involves characterizing the uncertainty in the signal strength reading due to noise as Gaussian. More particularly, a value for the standard deviation of the signal strength readings within the space is prescribed. In tested embodiments, the standard deviation was ascertained empirically in view of the particular space involved. The covariance matrix $\Sigma$ is defined as a 4×4 identity matrix scaled by the prescribed standard deviation of the signal strength readings. Given this, the nearest neighbor calibration signal strength vector $s_n^*$ to the most current locating signal strength vector s is computed as $$s_n^* = \min_{j=0\ldots N_n-1} \|s - s_n^{(j)}\|,$$

where $N_n$ is the number of calibration vectors at representative location n and $s_n^{(j)}$ are the calibration vectors assigned to location n. This computation is then used to define the probability of measuring the most current locating signal strength vector generated at a particular representative location P(s|n) as $$P(s\mid n) = \frac{1}{\left(\sqrt{2\pi}\right)^4 |\Sigma|^{0.5}} e^{-\frac{1}{2}(s-s_n^*)^T \Sigma^{-1}(s-s_n^*)}.$$

In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

1.0 Exemplary Operating Environment

Figure 1:
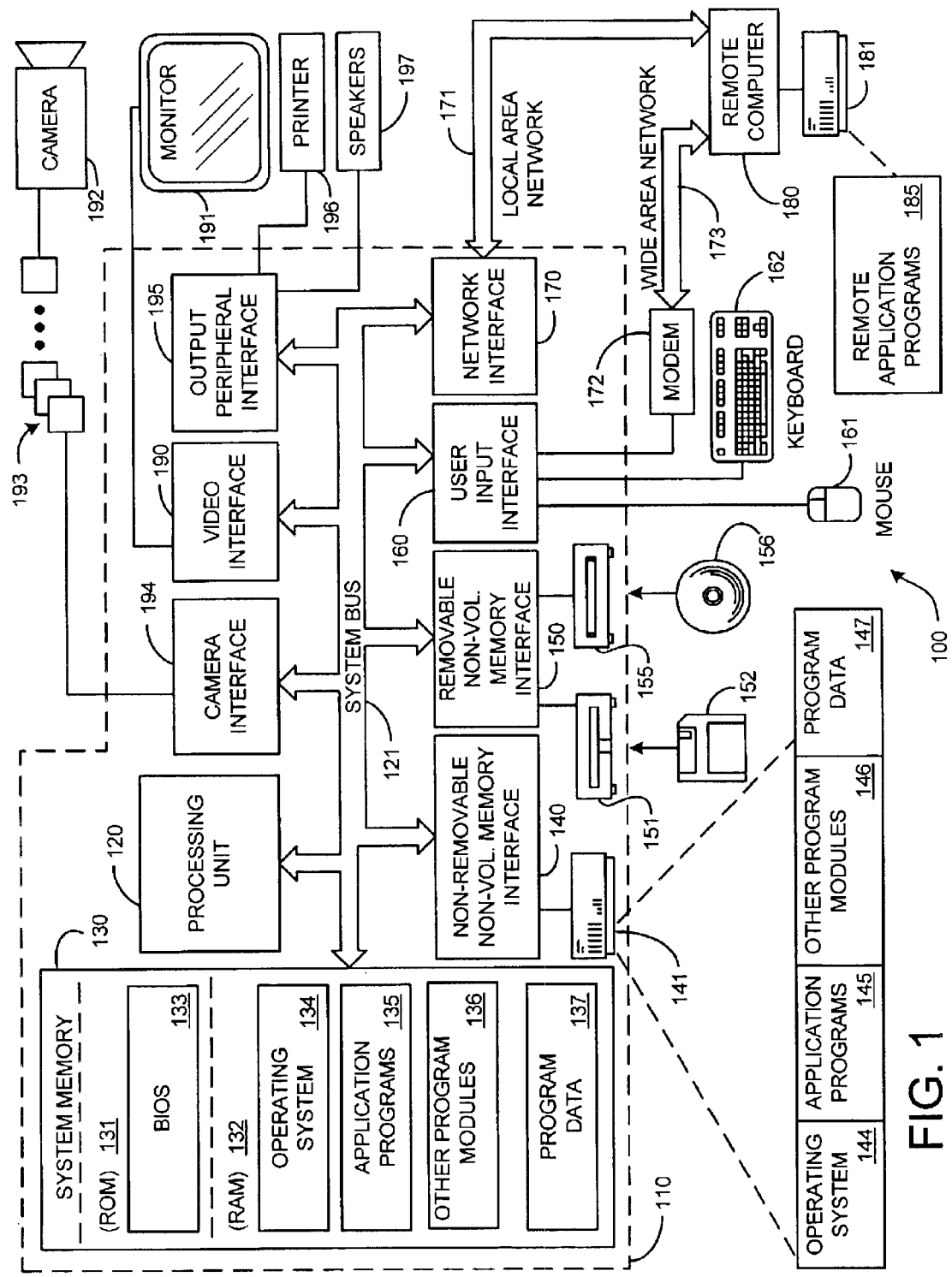
FIG. 1 is a diagram depicting a general purpose computing device constituting an exemplary system for implementing the present invention.

Before providing a description of the preferred embodiments of the present invention, a brief, general description of a suitable computing environment in which the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Of particular significance to the present invention, a camera 163 (such as a digital/electronic still or video camera, or film/photographic scanner) capable of capturing a sequence of images 164 can also be included as an input device to the personal computer 110. Further, while just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining part of this description section will be devoted to a description of the type of active badge location tracking system that can advantageously employ the present location measurement process and the program modules embodying the process itself.

2.0 Active Badge Location Tracking System

The present location measurement process can be employed in any RF-based location tracking system in which RSSI data is captured. One such system is the subject of a co-pending U.S. patent application entitled "RADIO-FREQUENCY BADGE FOR LOCATION MEASUREMENT", having a Ser. No. of 10/112,217, and a filing date of Mar. 29, 2002. The system described in the co-pending application will be used as an example to facilitate the description and implementation of the present location process. In general, the co-pending application describes a system that determines the location of persons and objects carrying radio frequency (RF) transmitters that transmit data messages to RF receivers connected to a computer in a computer network. The receivers forward data received from the transmitters to the network, along with radio signal strength indicator (RSSI) data, for computation of the location of the person or object carrying each transmitter. The present system and process also uses the RSSI information to measure the location of a person or object carrying a transmitter, but in a very different way.

The system of the co-pending application includes a plurality of battery-powered, radio frequency (RF), transmitters (TXs) that are carried by the person or object being tracked. A plurality of RF receivers (RXs) are used to receive location messages transmitted by TXs within signal range of the RX. Each RX is connected to a computer, such as a host PC, which receives data messages from the RX generated using a location message received from a TX. A centralized computer is in communication with each of the computers associated with a RX via a conventional network. The centralized computing device tracks the location of each person or object carrying a TX, using data derived from data messages forwarded to it from the RX-connected computers.

The location messages transmitted by each TX include at least a transmitter identifier which uniquely identifies the particular TX transmitting the location message. Each RX receiving the location message from a TX measures the strength of the signal carrying the message to produce a radio signal strength indicator (RSSI). The RX then generates a data message that is forwarded to the computer associated with that RX. This data message includes at a minimum the transmitter identifier from the location message and the RSSI associated with the location message.

The location messages transmitted by the TXs can also include error detection data, preferably in the form of a message count and conventional checksum value. The message count is simply a number which is incremented each time a TX transmits a location message. The error detection data can be used in different ways. For example, the RX can determine whether a location message received from a TX has a message count increment one unit above the last, previously received, location message transmitted from that TX. If the message count is too high, then it is deemed that an interim location message was lost and the RX foregoes providing a data message corresponding to the out-of-sequence location message to the computer network. The same policy can be followed if the RX finds a received location message is incomplete or corrupted should the checksum not match the data received. Alternately, the RX can include the message count and checksum values received from a TX in the data message it forwards to the centralized computer. The centralized computer then decides whether or not to use the other data in the data message for locating purposes.

The battery-powered TX of the foregoing location tracking system has unique conservation features for extending the life of the battery. In general, the TX is constructed using a microcontroller, a tilt switch, an accelerometer which is connected to the microcontroller and which provides a signal indicative of the severity of motion to which the TX is being subjected, one or more manually-operated function selection switches which are connected to the microcontroller and which activate and deactivate particular functions of the TX, a RF transmitter unit which is also connected to the microcontroller and which transmits the location message supplied to it by the microcontroller, and finally a power supply that includes a battery for powering the electronic components of the TX. The power saving features essentially involve using the accelerometer signal to curtail transmission of location messages during periods when there is no movement of the TX about an environment, such as an office building. By foregoing the transmission of location messages when the person or object has not moved, the power required to send the transmission is saved. This task can be accomplished by counting the number of times the accelerometer signal exceeds an accelerometer signal level threshold in a prescribed period of time (e.g., 1 second). If the count does not exceed a prescribed number (e.g., 2), the location message is not transmitted. If, however, the count does exceed the prescribed number a transmission is initiated. The accelerometer threshold represents a signal level over which it is likely the person or object carrying the TX is actually moving about the environment.

Further power can be saved by powering down the TX if no substantial movement has occurred for a period of time. Specifically, whenever the transmission of the location message is not made owing to a lack of movement, the microcontroller of the TX waits a prescribed timeout period (e.g., 2 seconds) and then counts the number of times the accelerometer signal exceeds the accelerometer signal level threshold in the aforementioned prescribed period of time. It is then determined if the count exceeds the aforementioned prescribed number. If the count does not exceed the prescribed number, it is next determined if a prescribed shutdown time limit (e.g., 1 minute) has been passed since the last transmission of a location message by the TX. Whenever it is determined that the shutdown time limit has not been exceeded, the process of waiting and sampling the accelerometer signal is repeated. If at any time during this process it is discovered the count exceeds the prescribed number, then the transmission of a location message is initiated. If, on the other hand, the count is not found to exceed the prescribed number during any iteration up to the time the shutdown time limit is exceeded, the TX is powered down to extend the life of the battery.

The TX stays in the foregoing powered down condition until one of the following occurs. First, preferably the aforementioned manually-operated function selection switches includes a "power on" switch. If a user activates this switch, the TX is powered up, regardless of whether it was in the power saving shutdown mode or not. In addition, the TX can be equipped with a motion-activated tilt switch. This switch remains open when the TX is at rest, but when the TX is moved it closes. If the TX is in the powered down condition when the tilt switch closes, a signal is sent to the microcontroller that caused the TX to be powered back up. Thus, if a powered down TX is moved, it reactivates. Finally, the microcontroller can be programmed to "wake up" periodically during the shutdown mode (e.g., once every hour) and to initiate the transmission of a location message. This last feature is useful in finding lost badges.

The power saving mode is the default operating mode. However, the aforementioned manually-operated function selection switches can be used to active alternate operating modes. For example, the switches optionally include a continuous transmission mode switch. This switch when activated causes a location message to be transmitted at prescribed intervals (e.g., every 1 second). This continuous transmitting mode of operation would override the power saving features and would remain in force until a user manually deactivates the switch. Another switch that can be included is a send-once switch, which when activated causes the microcontroller to transmit a location message regardless of when the location message would have been transmitted had the send-once switch not been activated. This is a one-time event, however, and the power saving mode of operation would be reestablished once the transmission is complete.

It is noted that the accelerometer data can also be included in the location message. This data can be used by the centralized computer to perform motion studies and the like. Specifically, an accelerometer signal history in the form of a count of the number of times the accelerometer signal exceeded the accelerometer signal level threshold in the aforementioned prescribed period of time is included in the location message. Preferably, a separate count is included for each consecutive prescribed period of time occurring since the last transmission of a location message.

In view of the foregoing description, it is evident that each transmission packet sent by a TX contains the ID of the transmitter, and optionally a measured physical activity level, and error detection data. With the addition of RSSI data, each transmission results in the computer associated with an RX receiving a record consisting of at least the transmitter ID, RSSI, and optionally the measured physical activity level and error detection data if included in the TX transmission.

3.0 Network Data Logging

As indicated above, each RX is connected to a host computer (e.g., a PC) that receives the data messages from the RXs, and forwards the information on to the centralized computer via the network. It is noted that for use with the present location measurement process, the system described in the co-pending application can have more than one connected RX. When multiple RXs are connected to the same host computer, the identity of the particular connection port each is connected to is used to differentiate the messages coming form each RX. For example, if two RXs are connected to a host computer via separate RS-232 data ports, the data port name is appended to a RX message coming in on that port. In this way each RX can be uniquely identified by the name of its host computer and the data port it is connected to on that computer.

The task of receiving the RX data messages is accomplished using a network data logging program, which runs on each host computer and which listens for messages from the RX or RXs connected to it. One such data logging scheme was described in a co-pending U.S. patent applications entitled "LOCATION MEASUREMENT PROCESS FOR RADIO-FREQUENCY BADGES", having a Ser. No. of 10/137,238, and a filing date of May 1, 2002. In general, this network data logging scheme involves each computer associated with a RX generating badge hit messages upon receipt of a data message from the RX and providing the badge hit messages to a database (e.g., a SQL Server database) residing on the centralized computer of the network. These badge hit messages each include the information received in the RX data message, as well as an identifier identifying the computer in the network and the aforementioned host computer port identifier. A badge hit table is created using the badge hit messages in the aforementioned badge hit database residing on the centralized computer. Essentially, the badge hit database has a separate entry derived from each badge hit message received. The fields associated with each entry include the information received in the badge hit message and a hit time assigned to the entry indicating the time the entry was added to the table. The centralized computer is responsible for appending a time stamp to each incoming record in order to avoid clock synchronization issues on the PCs.

4.0 Location Measurement Process

Figure 2:
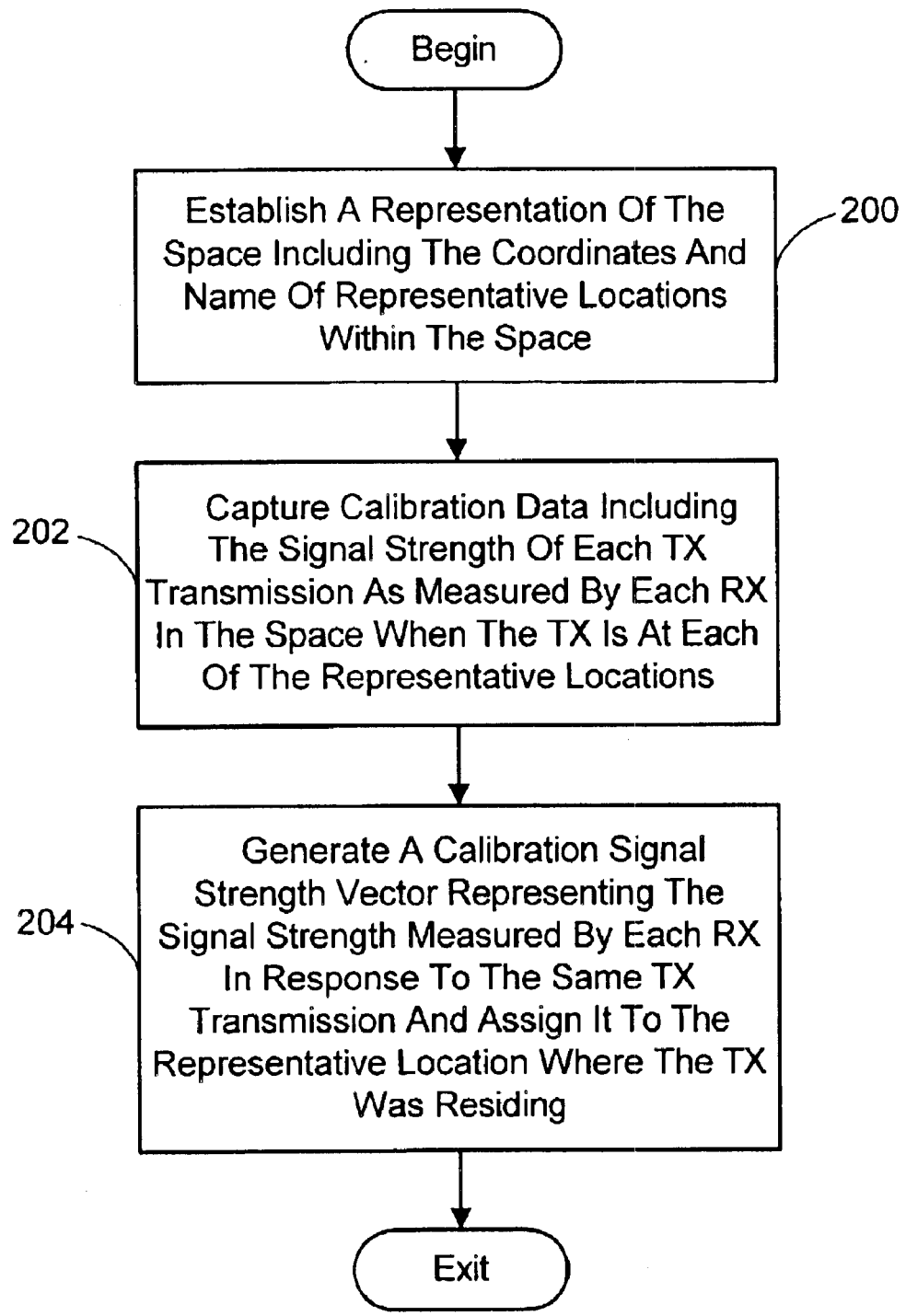
FIG. 2 is a flow chart diagramming an overall process for the calibration phase of the location measurement process according to the present invention.

The location of each TX transmitting a TX ID message is computed by the centralized computer using the badge hit data. The process used to accomplish this task, which is the aforementioned location measurement process, includes two phases—namely a calibration phase and a locating phase. In general, the calibration phase is accomplished via the following process actions, as shown in the high-level flow diagram of FIG. 2:

a) establishing a representation of a space in which the location of a person or object carrying a TX is to be measured, where the representation includes the coordinates and name of representative locations in the space where the person or object might be located at any point in time (process action 200);

b) capturing calibration data provided by the RXs present in the space that includes the signal strength of each TX transmission measured by each RX when the TX is at each of the representative locations in the space (process action 202) and, c) generating a calibration signal strength vector representing the signal strength measured by each RX in response to the same TX transmission and assigning the calibration vector to the representative location where the TX was residing when the transmission was made (process action 204).

Figure 3:
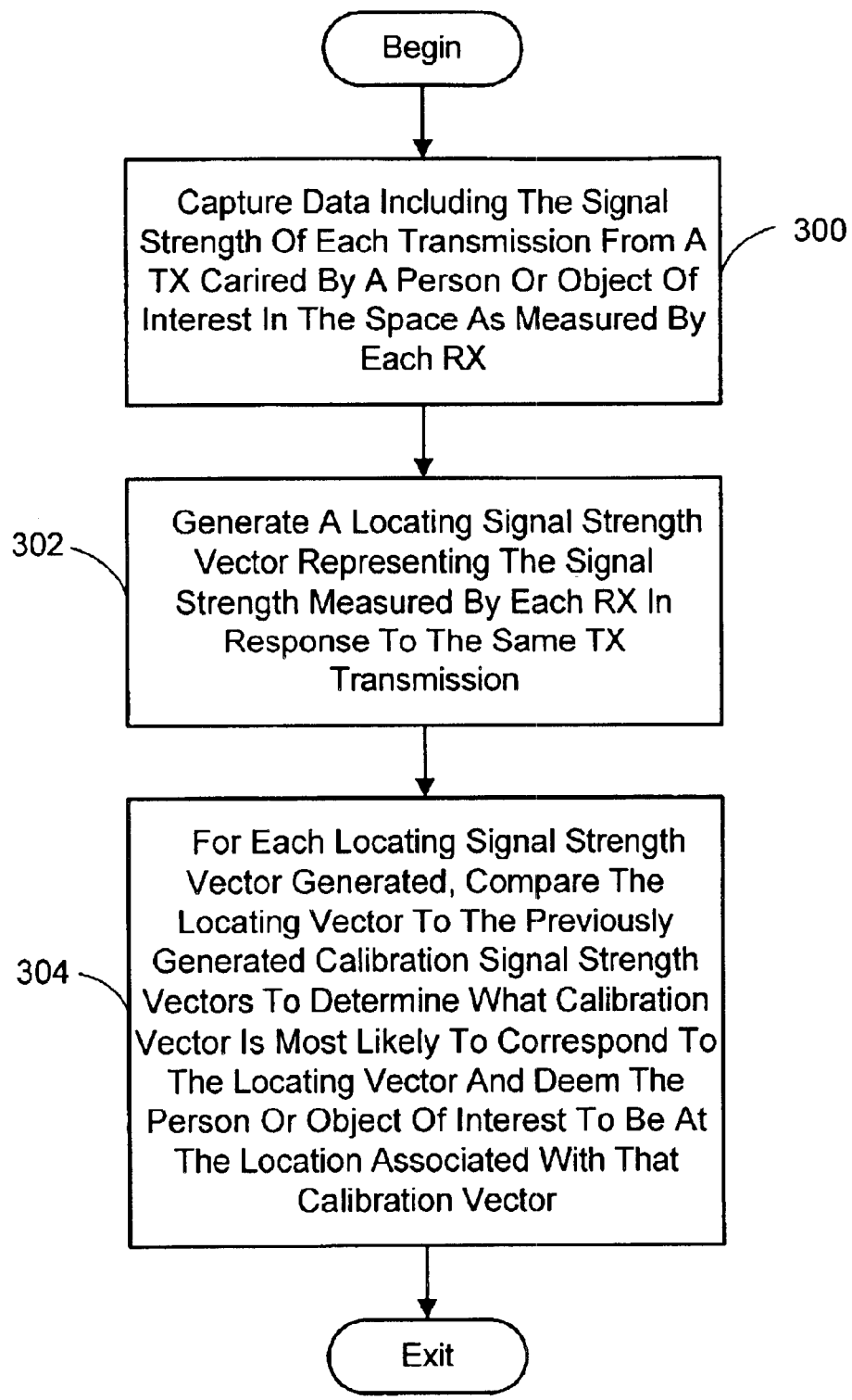
FIG. 3 is a flow chart diagramming an overall process for the locating phase of the location measurement process according to the present invention.

In regard to measuring the location of a person or object carrying a TX in the now calibrated space, the locating phase of the process is generally accomplished via the following process actions, as shown in the high-level flow diagram of FIG. 3:

a) capturing data provided from the RXs present in the space that includes the signal strength of each TX transmission measured by each RX associated with a TX carried by a person or object of interest within the space (process action 300);

b) generating a locating signal strength vector representing the signal strength measured by each RX in response to the same TX transmission associated with the TX carried by the person or object of interest (process action 302); and c) for each locating signal strength vector generated, comparing it to the previously generated calibration signal strength vectors to determine what calibration vector is most likely to correspond to the locating vector and deeming the person or object of interest to be at the location associated with that calibration vector (process action 304).

The calibration and locating phases will now be described in more detail in the sections to follow.

4.1 Calibration Phase

Each RF transmission from a mobile transmitter is heard by all the receivers in the area. In open space it might be expected that the signal strength would fall off with the square of the distance between the transmitter and receiver. However, this conventional rule does not necessarily hold, as it has been found that in an indoor environment significant deviation from the inverse square law is observed, which is probably attributable to reflection and interference of the signal. Based on the difficulty of analytically modeling signal strengths, the present process is based instead on an empirical approach to predicting signal strengths. In general, this empirical approach requires that a series of calibration signal strength readings be recorded at predefined locations in the indoor space in which the locating system is to operate (e.g., a home or an office building).

4.1.1 Spatial Representation

In order to record the calibration signal strength readings, a representation of the space being calibrated is established first. One simple way of accomplishing this task is to define the space in terms of its floor plan and a predefined coordinate system. Any coordinate system can be employed to specify locations within the space. For example, a simple x-y coordinate system can be employed with the origin of the system being arbitrarily located at a prescribed point in the space being calibrated.

The representation of the space also includes the aforementioned predefined node locations, which are chosen manually. Generally, a node position should be specified for each office or room in the space being calibrated, as well as one outside each door in the hallways. In addition, if the indoor space includes a large room (e.g., one that is larger than a typical one or two person office) multiple nodes should be established within the room, preferably one for each one or two person office-size rectangle in the room.

Figure 4:
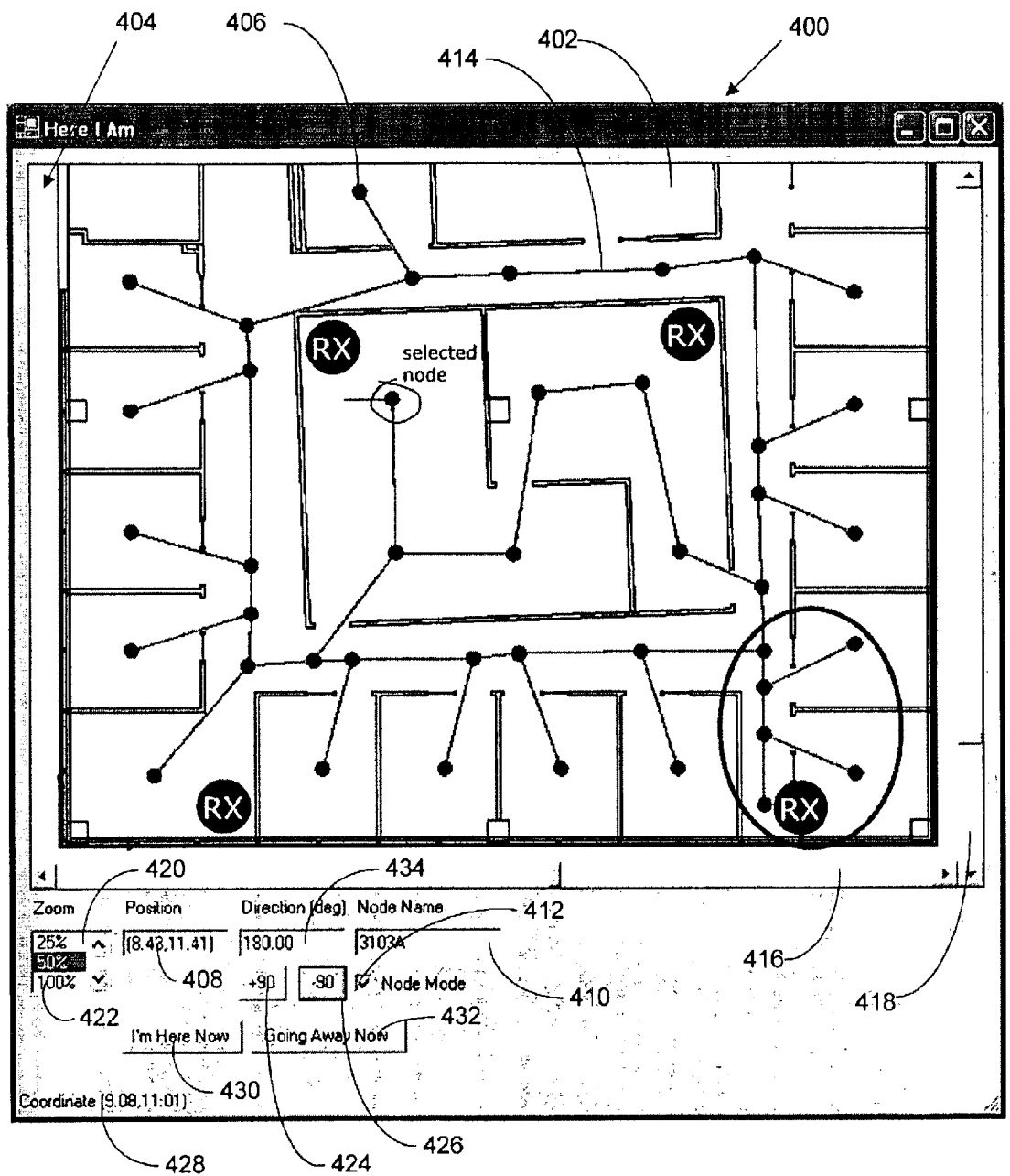
FIG. 4 shows a graphic user interface calibration window layout according to the present invention.

Essentially, the centralized computer would be programmed with the calibration process as is being described herein, and provided the representation of the space including the node locations. The node locations are provided to the centralized computer in the form of a node identifier or name and its coordinates within the pre-established coordinate system. In order to facilitate the establishment of the spatial representation and its transmission to the centralized computer, a calibration program can be employed by the person calibrating the space (i.e., the calibrator). In one embodiment, this calibration program would run on a portable computer, such as a laptop that can be carried about the space by the calibrator, and would include a graphic user interface for use by the calibrator to enter the necessary information. An example of such an interface is shown in FIG. 4. Essentially, a floor plan of the space being calibrated along with the details of the aforementioned coordinate system and the correspondence of the system to the floor plan are input into the calibrator's computer. The floor plan 402 appears in a display sector 404 occupying the upper portion of a calibration window 400. This floor plan 402 can be created by any conventional program design for this purpose. For example, Microsoft Corporation's Visio® was used in tested embodiments. The node location coordinates and location names could also be established elsewhere and imported into the calibration program as a simple text file. Once inputted, the node locations appear as small, solid markers 406 in the floor plan at their assigned coordinates. Alternately, the nodes could be entered into the calibration program directly. This would be accomplished by the calibrator identifying a desired node location, such as by placing a screen cursor over the location and selecting it via conventional cursor positioning and selection means (e.g., a computer mouse, touch pad, track ball, keypad, and the like). The calibration program would then specify the coordinates of the selected location and display them in a position field 408 appearing below the display sector 404. The calibrator could then enter a name for the node in the Node Name field 410, also appearing below the display sector. It is noted that the node name could also be generated automatically by the calibration program via a prescribed naming scheme as an alternative to the calibrator entering a name. The newly created node is then displayed in the floor plan as a solid marker 406 at its established coordinates.

Finally, the allowable path between the established modes is also specified as part of the representation of the space being calibrated. The allowable path is displayed in the floor plan as straight lines 414 connecting the nodes. Essentially, for each node, all the allowable paths to immediately adjacent nodes are specified and displayed. The allowable path between two adjacent nodes represents the physical path that a person or object carrying a TX could take in view of the configuration of the space being calibrated. For example, a person could walk from an office to the hallway. Accordingly, an allowable path would exist between a node established in the office and one established outside the office in the hallway. Further, a person could not walk through a wall separating one office from an adjacent office. Accordingly, there is no allowable path between adjacent nodes established in adjacent, walled-off offices. The allowable paths between adjacent nodes are generated from a simple text file that is input to the calibration program. In general, the same text file mentioned previously is modified to include the transition probabilities associated with and between each node location. A non-zero transition probability is assigned to each node representing the probability of staying at that node between TX transmissions. In addition, non-zero probabilities are assigned between each node and the adjacent nodes connected by an allowable path. Finally, the transition probabilities between each node and every other node in the space that do not represent an allowable path are set to zero. The aforementioned lines 414 are generated in the floor plan by the calibration program to connect all nodes having a non-zero transition probability between them. It is noted that the path data is also provided to the centralized computer by the calibration program running on the calibrator's computer. This information, along with the node location data will be used in the calibration process, as well as in the location phase, as will be described shortly.

Figure 5:
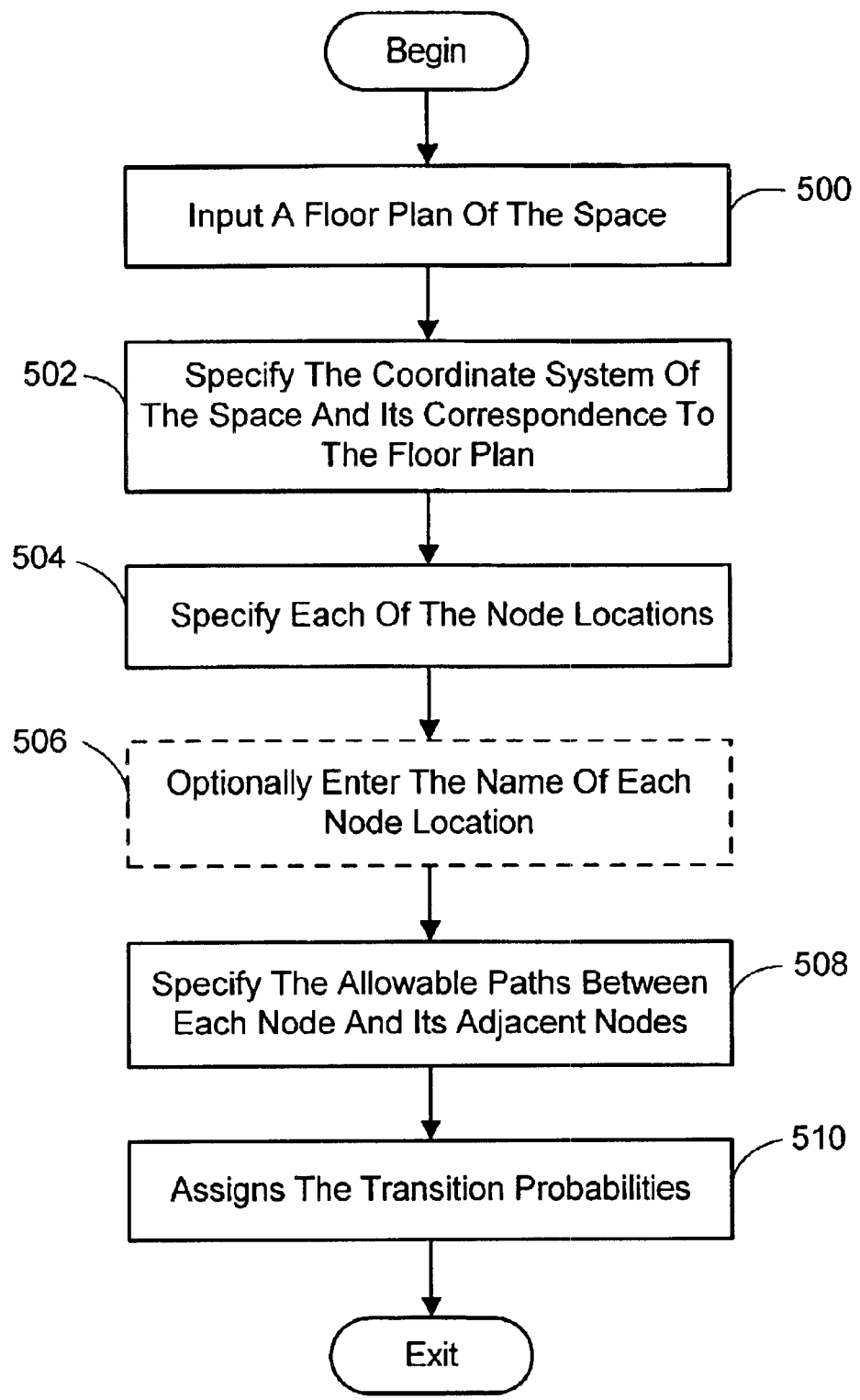
FIG. 5 is a flow chart diagramming a process for creating a representation of the space in which the location of persons and objects is to be measured using the calibration window interface of FIG. 4.

The foregoing procedure for generating the spatial representation using the calibration program running on the calibrator's computer is summarized in the flow diagram depicted in FIG. 5. The calibrator first inputs the floor plan of the space (process action 500) and then specifies the coordinate system of the space and its correspondence to the floor plan (process action 502). The calibrator then specifies each of the aforementioned node locations (process action 504). In addition, the name of the location is optionally entered (optional process action 506). This last action is optional as the calibration program itself may assign the names without the need of calibrator input. Next, the calibrator specifies the allowable paths between each node and its adjacent nodes (process action 508). Finally, in process action 510, the calibrator assigns the transition probabilities.

The calibration window shown in FIG. 4 also has several standard features that assist the calibrator in setting up the spatial representation and as will be seen later in calibrating the space. These features include horizontal and vertical scroll bars 416, 418 displayed at the side and bottom of the display space 404. These scroll bars 416, 418 are used in the conventional way to bring parts of the floor plan 402 into view in the display space 404, which are hidden owing to the floor plan being too large to display at the desired scale in the area allotted to the display space. In addition, there is a zoom field 420 with a down arrow that when selected displays a list 422 of available zoom settings for selecting the scale of the floor plan 402 in the display sector 404. The calibrator selects a desired zoom setting from the list 422 to change the zoom setting, and can use an up arrow to close the zoom list. There is also a cursor location field 428 that displays the current location of the cursor on the display of the floor plan 402 in terms of the aforementioned predefined coordinate system. Finally, there is a Node Mode selection box 412, which when selected activated a mode that causes the node closest to the point on the floor plan selected by the calibrator to become a selected node.

The calibration window also includes two buttons 430, 432, respectively labeled "I'm Here Now" and "Going Away Now". These buttons 430, 432 are used in the calibration process that will be described shortly. In addition, there is a direction field 434 and a pair of buttons 424, 426 labeled "+90" and "−90" displayed below the display sector. The direction field 434 and buttons 424, 426 is not used in the present calibration process and so is ignored, and could be eliminated from the calibration window for the purposes of the present invention.

4.1.2 Calibration

In essence, the purpose of the calibration process is to establish what the badge hit data is likely to be when a TX transmits from a location in the space under consideration. This information is then used to estimate the location of a person or object carrying a TX during the locating phase of the present location measurement process. More particularly, the calibration process attempts to record what the badge hit data received from each RX in the space would be if a TX transmitted from each of the establish node locations in turn.

To this end, one embodiment of the calibration process involves the calibrator moving through the space under consideration with the aforementioned portable computer, which is in wireless communication via the space's network with the centralized computer. The calibrator also wears a TX which is set to the periodic transmit mode so that regular transmissions are made (e.g., once every second). It is noted that all the badge hit data provided to the centralized computer initiated by a TX in the periodic transmission mode is modified to include an indicator that the TX responsible is in this mode. This indicator can be included in the TX transmission, as it was in the tested versions of the present invention where the previously-described activity level indicator was replaced by a special value indicating the TX is transmitting in the periodic transmission mode. Each time the calibrator reaches a node location in the space as estimated using the floor plan, he or she selects the corresponding node in the display and then selects the "I'm Here Now" button. This causes the calibrator's computer to transmit a time-stamped and location/node name-stamped marker to the centralized computer, which is also simultaneously collecting badge hit data initiated by transmissions from the calibrator's TX. The centralize computer annotates the badge hit data base to indicate where in the sequence of badge hit data messages the calibration of a node begins based on receipt of the aforementioned marker. Once at a node location and after sending the "I'm Here Now" message, the calibrator rotates and moves in an effort to replicate the likely positions and orientations of a person wearing a TX at that node. For the hallway nodes, this can entail spinning around in place a few times. It is noted that the sampling of signal strengths at the nodes was not meant to measure the frequency of occurrence of signal strengths. Instead, the purpose was to get a reasonable sampling of all the signal strength vectors that would likely be measured at each node. For this reason, it did not make sense to try to summarize the training data with a histogram or probability distribution function.

After completing the aforementioned maneuvers at a node, the calibrator selects the "Going Away Now" button to send another a time-stamped and location/node name-stamped marker indicating the end of calibration for a particular node. The calibrator then repeats this procedure at all the remaining nodes. The result is a badge hit database containing badge hit data including signal strength readings bracketed by markers indicating which nodes the transmissions had come from. This data is used to characterize the node as will be discussed in the sections to follow.

Figure 6:
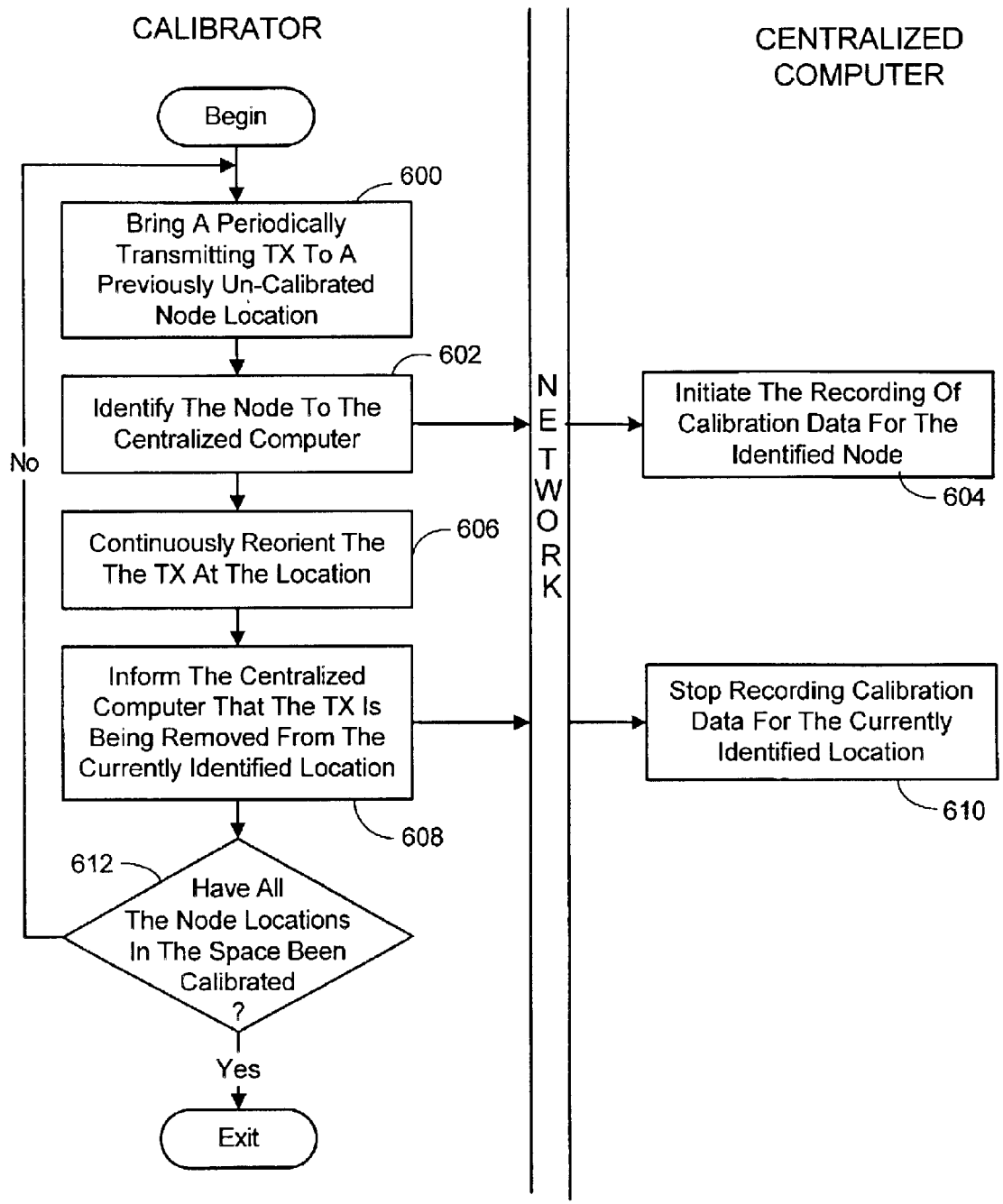
FIG. 6 is a flow chart diagramming a process for calibrating the space in which the location of persons and objects is to be measured according to the present invention.

The foregoing procedure for calibrating the space is summarized in more general terms in the flow diagram depicted in FIG. 6. The procedure begins with the calibrator bringing a periodically transmitting TX to a previously un-calibrated node location in the space (process action 600). It is noted that the node locations are the previously chosen locations of the representation of the space that represent places where a person or object being tracked might be at any particular time. Once the TX is at the selected node location, the calibrator identifies this location to the centralized computer (process action 602), which then initiates the recording of calibration data for that location (process action 604). As indicated previously, the recording of calibration data entails recording badge hit messages attributable to each RX residing in the space and annotating the messages to indicate that they represent calibration data for the selected location. The calibrator then moves the TX about at the selected location to reorient in such a manner as to mimic how a TX carried by a person or object being tracked might be oriented at that location (process action 606). When the calibrator has finished the TX reorientation routine, he or she informs the centralized computer that the TX is being removed from the selected location (process action 608), at which time the centralized computer stops recording calibration data for that location (process action 610). It is noted that the action of stopping the calibration data recording merely means that the centralized computer stops annotating the incoming badge hit messages with an indicator that they represent calibration data for the selected location. The badge hit messages would still be recorded for other reasons not related to calibrating the space. It is next determined if all the node locations in the space have been calibrated (process action 612). If not, the foregoing process (i.e., process actions 600 through 612), is repeated. If, however, all the node locations have been calibrated, the process ends. While not mentioned in the foregoing calibration procedure, the centralized computer also processes the badge hit messages attributable to the same TX transmission to produce a calibration signal strength vector. This can be done on the fly as the badge hit messages are received, after the recording of all the calibration data for a particular location is complete, or even after all the node locations in the space have been calibrated.

One interesting question is how the variation of signal strengths at a node compare with the variation of signal strengths throughout the whole space. For measuring location, it would be preferred that the location be the primary factor in the variation of signal strengths, and that small variations of position and orientation at a node cause relatively small variations in signal strengths. Unfortunately, this was found not to be the case. In fact, the maximum intra-node range of signal strengths was about 87% of the inter-node range for the whole set of nodes. Thus, rotation and small motion at a node can cause fluctuations in signal strength that are about as large as fluctuations caused by moving from node to node. The uncertainty caused by this phenomenon can be handled using a constrained path approach, as will be described later.

In a test of the present location measurement process, the calibration procedure was performed by someone walking around a part of a floor of an office building with a laptop PC wirelessly connected to the building's network and running the aforementioned calibration program. This constituted the space being calibrated for the test.

The person performing the calibration also carried a TX which was set to the periodically transmit mode so as to transmit at one second intervals. Each RF transmission from the TX was heard by all the RXs in the calibration space. The signal strength readings captured as a result of each transmission were characterized as a column vector s. In the tested case, four RXs were set up in the calibration space, and so each signal strength vector had four scalar elements. In the spatial representation procedure that preceded the calibration testing, 42 nodes (i.e., N=42) were establish in the space. For each of the nodes, the calibration signal strength readings were characterized as $s_i^{(j)}$, where i indexes the node (i=0 . . . N−1), and j indexes the calibration sample at that node. $N_i$ is the number of readings taken at node i, so for $s_i^{(j)}$, j=0 . . . N, −1. Each $s_i^{(j)}$ is a vector of four signal strengths, one from each receiver. In the test calibration a total of 1256 calibration signal strength vectors were generated. The number of calibration vectors taken for each node varied from 12 to 50, with an average of 30.

4.2 Locating Phase

In general, the locating phase of the present location measurement process involves determining the location of a person or object carrying a TX in the calibrated space by comparing the latest signal strength vector s against the calibration signal strength vectors $s_i^{(j)}$ generated as a result of the foregoing calibration procedure. In one embodiment of the present invention, this task is accomplished using a nearest neighbor approach, while in another embodiment, the location measurement task was accomplished using a constrained path approach. These two embodiments of the location measurement procedure will be described separately in the sections to follow.

4.2.1 Nearest Neighbor Location Measurement

The nearest neighbor location measurement approach simply finds the calibration signal strength vector $s_i^{(j)}$ with the minimum Euclidian distance to the latest signal strength vector s associated with a TX being carried by the person or object being tracked. The person or object is declared to be at the node location having the calibration signal strength vector $s_i^{(j)}$ associated therewith that is determined to have the minimum Euclidian distance to the latest signal strength vector s. More formally, given a signal strength reading s, the "closest" n is computed as $$n = \operatorname*{argmin}_{i=0 \ldots N-1} \left( \min_{j=0 \ldots N_i - 1} \left\| s - s_i^{(j)} \right\| \right) \tag{1}$$

It is noted that in the previously described test case, the nearest neighbor computation is relatively fast with only 1256 calibration vectors to compare to—certainly fast enough to keep up with a reasonable TX transmission rate (e.g., 1 Hz).

In a test of the nearest neighbor location measurement technique, the results were quantified by computing the Euclidian distances between the nodes identified using the technique and the node that the test subject carrying the TX was actually nearest at the time of each transmission from the TX. It was found that the average error was 4.57 meters.

4.2.2 Constrained Path Location Measurement

The nearest neighbor technique ignores any adjacency relationships between the nodes, so it allows instantaneous transitions between nodes that are separated by a wall and/or an arbitrarily large distance. Thus, it may be possible to improve the performance of the present location measurement process by adding path constraints that only allow physically realizable paths through the nodes.

4.2.2.1 Graph and Transition Probabilities

Essentially, the path constraints are instantiated with a manually constructed graph of nodes, such as created using the previously-described interface shown in FIG. 4. The connections between the nodes show which paths are allowable. This is an easy way of preventing paths from going through walls and of preventing superhuman transitions between distant nodes.

The allowable paths between nodes are deemed to be hard constraints. However, in addition, the aforementioned transition probabilities are established between connected nodes as soft constraints on the likelihood of moving between nodes or remaining at the current node. The transition probabilities are assigned manually based on assumptions about people's behavior. As an example of the probabilities assigned to nodes, in a tested embodiment of the process it was assumed that the probability of moving from a node in an office to the node outside the office's door was 0.05 in a one-second interval between TX transmissions, with the remaining 0.95 being the probability of remaining at the office node. Of course, this is just an example. The actual probabilities assigned to each transition between connected nodes will be depend on the particular layout of the space in which a person or object is being track, as well as the type of movement that is expected (e.g., walking, running, riding in a vehicle, and so on). However, it is believed the transition probabilities can be readily estimated for the particular circumstances of the space under consideration without any undue difficultly or experimentation.

Figure 7:
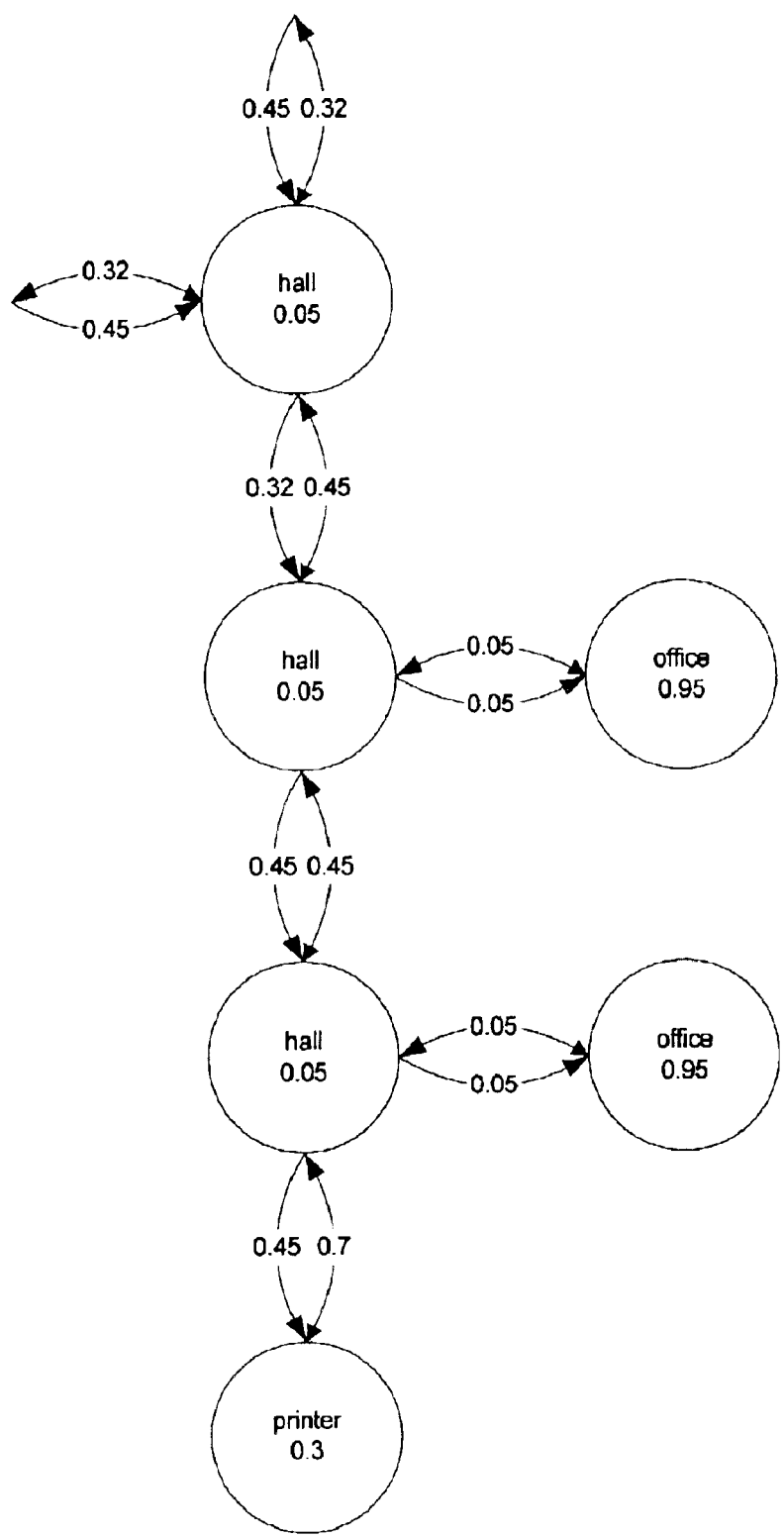
FIG. 7 shows examples of the transition probabilities that were used in a tested embodiment of the present location measurement process where the circles represent the nodes, the numbers inside the circles represent the probability of staying at the node location, and the curved annotated arrows between the nodes identify to transition probability for transitioning to the indicated node.

In more formal terms, the probability of transitioning from node i to node j, is defined as $a_{i \to j}$, and transition probabilities are chosen such that $a_{i \to j} \geq 0$ and $$\sum_{j=0}^{N-1} a_{i \to j} = 1,$$

where N is the number of nodes. It is noted that $a_{i \to i}$ indicates the probability of staying at node i, and it is never zero for the present model. To eliminate the possibility of transitioning between nodes i and j, the transition probability is simply set to zero, i.e., $a_{i \to j}=0$. This is how transitions through walls or other obstructions, and to impossibly remote locations, is precluded. This is also how the hard constraints defined in the graphing of the allowable paths are incorporated into the transition probabilities, as only those paths that are allowable will have non-zero probabilities. FIG. 7 shows some examples of the transition probabilities that were used in a tested embodiment of the present process. The nodes involved are from the lower right part of the map shown in FIG. 4 and have an oval drawn around them. The assigning of transition probabilities between nodes provides a principled way of incorporating prior beliefs about people's behavior into the location measurement process. The transition probabilities are balanced against the sensor measurements in an attempt to compute paths that satisfy both, as will be described shortly.

Another a priori set of probabilities that is needed is the probability of starting a path at a given node. More specifically, assume the probability of a path starting at node i is denoted as $\pi_i$. Since there is typically no prior knowledge of where a path starts, the probability of starting a node is set as $\pi_i=1/N$, where N is the number of nodes. This means the path can start at any node with equal probability. However, if there is some knowledge as to where a path might begin in the calibrated space then the starting node probabilities could be set to weight those nodes more heavily.

In view of the above, using the initial state probabilities and transition probabilities, the probability of a path $\{n_0,n_1,n_2,\ldots,n_{T-1}\}$ is $\pi_{n_0} a_{n_0 \to n_1} a_{n_1 \to n_2} \cdots a_{n_{T-2} \to n_{T-1}}$, if the signal strengths are disregarded. However, the signal strength data provides critical location information and is also considered. To this end, a hidden Markov model is employed.

4.2.2.2 Hidden Markov Model

The graph, initial state probabilities, and transition probabilities represent the a priori knowledge of people's behavior. The remaining element in tracking location is the signal strength data. One way of combining uncertain measurement data, discrete states, and transition probabilities between the states is through the use of a hidden Markov model (HMM)[3].

The "Markov" part of the HMM is manifested in the aforementioned transition probabilities. For example, say the sequence of nodes in a person's path up to time i-1 is $\{n_0,n_1,n_2,\ldots,n_{i-1}\}$. The first-order Markov assumption says that the probability of transitioning to some node $n_i$ at time i is a function only of node $n_{i-1}$ and not any of the other previous nodes. This probability is what is represented in the transition probabilities, $a_{i \to j}$. Stated as an equation, the first-order Markov assumption is $$P(n_i \mid n_{i-1}, n_{i-2}, \ldots, n_0) = P(n_i \mid n_{i-1}) = a_{n_{i-1} \to n_i} \quad (2)$$

The "hidden" part of the HMM has to do with the signal strength data. Since the node sequence is not being measuring directly, it is hidden from direct view, and the only things that can be seen are the signal strength vectors. The signal strength vector s is probabilistically related to the node $n_i$ via the probability distribution function P(s|n,), which is called the observation probability function.

Ideally, the observation probability would be computed with a carefully constructed physics-based model including considerations for the hardware involved, radio wave propagation equations, and the RF attenuation effects of objects and people. But this is too difficult to accomplish efficiently and economically. The next best approach would be to thoroughly sample signal strengths at all the nodes and empirically construct observation probabilities for each one. This is also too difficult, as it would mean spending considerable time at each node and trying to mimic the behavior of a typical user at that node, including turning, sitting, standing, bending, and moving, all of which have a significant effect on signal strength. Not only would all these behaviors have to be anticipated, their frequency of occurrence would have to be anticipated as well.

The approach taken in the present location measurement process was to compute the observation probability functions using the training data originally gathered for the nearest neighbor procedure described previously. This data was gathered by stopping at every node, turning and slightly moving, while recording signal strengths. This was intended to capture a series of plausible signal strength vectors, but not intended to capture their frequency of occurrence. To compute P(s|n,) from this data, the nearest neighbor calibration vector at the node $n_i$ is identified:

$$s^*_{n_i} = \min_{j=0 \ldots N_{n_i}-1} \|s - s_{n_i}^{(j)}\| \quad (3)$$

where, as a reminder, $N_{n_i}$ is the number of calibration vectors at node $n_i$, and $s_{n_i}^{(j)}$ are the calibration vectors at node $n_i$. The assumption here is that the calibration vector from node $n_i$ that most closely matches s corresponds to the physical pose of the walker at that node that produced s. The probabilistic part of the observation probability function comes from the signal noise inherent in a series of signal strength readings from a stationary transmitter, which is modeled as Gaussian. An experiment with the hardware described in Section 2.0 suggests that the noise standard deviation of signal strength is approximately one unit. Taking $s_{n_i}^*$ as the mean and assuming statistical independence among the RXs, the observation probability function is $$P(s \mid n_i) = \frac{1}{\left(\sqrt{2\pi}\right)^4 |\Sigma|^{0.5}} e^{-\frac{1}{2}(s-s^*_{n_i})^T \Sigma^{-1}(s-s^*_{n_i})} \quad (4)$$

where the covariance matrix $\Sigma$ is the 4×4 identity matrix scaled by the standard deviation of the signal strength readings, which was measured to be approximately one.

With the initial state probabilities, transition probabilities, and observation probabilities, it is possible to compute the probability of a given path through the nodes given the signal strength readings. The relevant parts are:

| | |
|---|---|
| Transmission times | $\{t_0, t_1, t_2, \ldots, t_{T-1}\}$ |
| Nodes along path | $N = \{n_0, n_1, n_2, \ldots, n_{T-1}\}$ |
| Measured signal strengths | $S = \{s(t_0), s(t_1), s(t_2), \ldots, s(t_{T-1})\}$ |
| Data likelihood | $P(S \mid N) = \pi_{n_0} a_{n_0 \to n_1} a_{n_1 \to n_2} \cdots a_{n_{T-2} \to n_{T-1}} \prod_{i=0}^{T-1} P(s(t_i) \mid n_i)$ |

Given a set of signal strengths S, the goal is to find the path N* that maximizes the data probability P(S|N). This path will conform to the aforementioned a priori expectations about the path as well as to the signal strength measurements. One way to do this is to check all possible paths. However, the use of the Viterbi procedure, described next, can provide a more efficient way of finding N*.

4.2.2.3 The Viterbi Procedure

The Viterbi procedure [3], results in the state sequence N* that maximizes P(S|N). It is based on a locating quantity denoted as $\delta_i(j)$, where $i=0 \ldots T-1$ is the time index and $j=0 \ldots N-1$ is the node index. For time $i=0$:

$$\delta_0(j) = \pi_j P(s(t_0) | j) \quad (5)$$

This is just the product of the probability of starting at node j (which is $\pi_j$) and the probability of measuring $s(t_0)$ at node j (which is $P(s(t_0)|j)$). The estimate of the first node in the sequence is simply the maximum of $\delta_0(j)$ over the node index j, i.e., $$n_0^* = \underset{j=0 \ldots N-1}{\operatorname{argmax}} (\delta_0(j)) \quad (6)$$

Subsequent values of $\delta_i(j)$ are computed recursively as $$\delta_i(j) = \underset{k=0 \ldots N-1}{\max} (\delta_{i-1}(k) a_{k \to j}) P(s(t_i) | j) \quad (7)$$

where the time index ranges over $i=1 \ldots T-1$. At each time i the node estimate is $$n_i^* = \underset{j=0 \ldots N-1}{\operatorname{argmax}} (\delta(j)) \quad (8)$$

Thus, the computations are simple, and each new signal strength reading gives a new node estimate.

Figure 8:
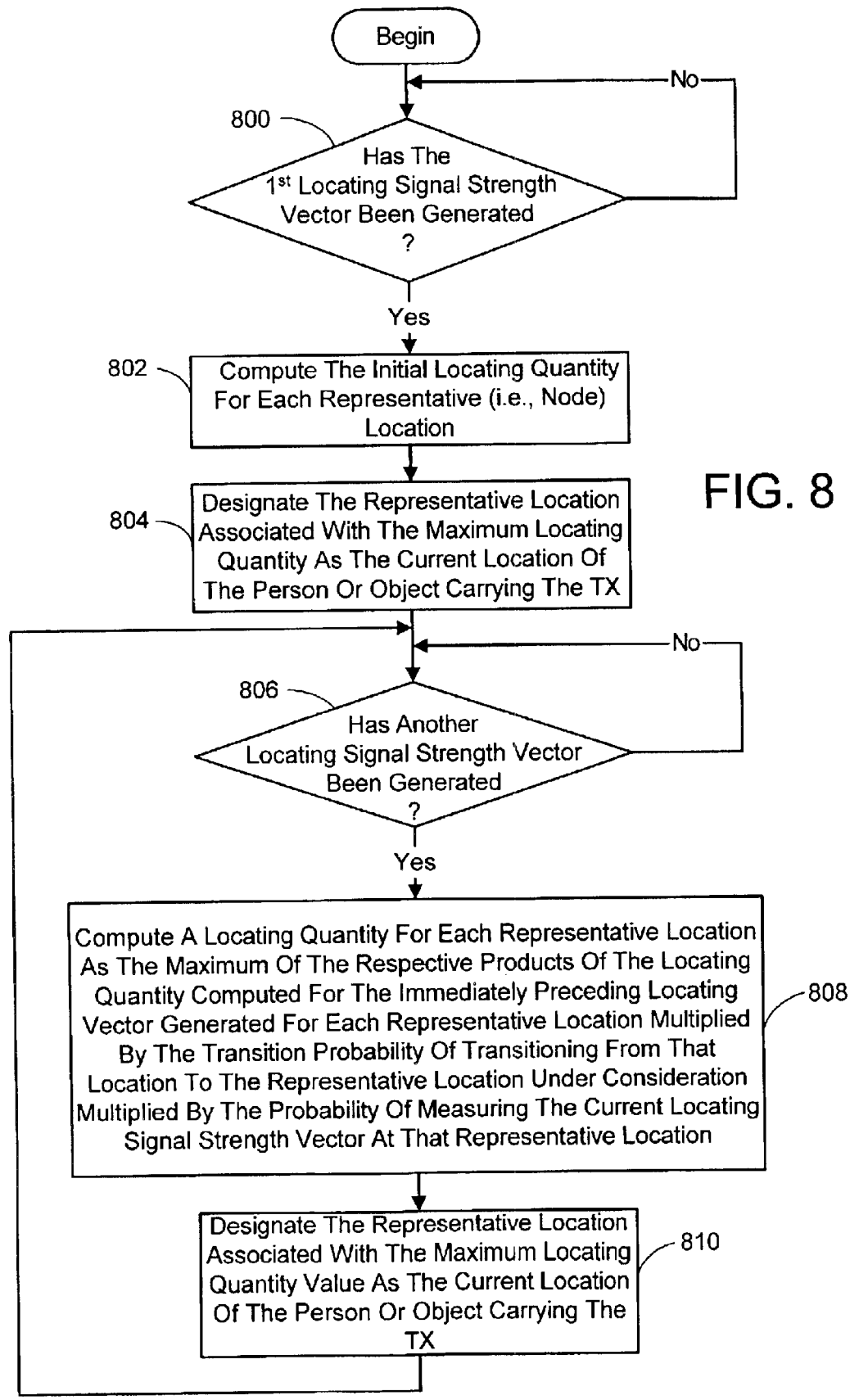
FIG. 8 is a flow chart diagramming a process that implements the signal strength comparison and location designation portions of the locating phase of FIG. 3.

The foregoing locating procedure is summarized in more general terms in the flow diagram depicted in FIG. 8. The procedure begins by determining if the first locating signal strength vector has been generated (process action 800). If not, this action is repeated until the vector is available. If it is determined that the first locating signal strength vector has been generated, then in process action 802, the locating quantity for each representative (i.e., node) location is computed. As described above, the locating quantity is defined as the product of the probability of starting at a representative location and the probability of measuring at that location the most current locating signal strength vector generated based on the calibration signal strength vectors generated for the location. Next, the representative location associated with the maximum locating quantity is designated as the current location of the person or object carrying the TX responsible for the locating signal strength vector (process action 804).

The locating procedure continues by determining if another locating signal strength vector has been generated (process action 806). If not, this action is repeated until the vector is available. When the next locating vector is available, the locating quantity for each representative location is computed. This time the locating quantity is defined as the maximum value of the respective products of the locating quantity computed for the immediately preceding locating signal strength vector generated for each representative location multiplied by the transition probability of transitioning from that location to the representative location under consideration multiplied by the probability of measuring the current locating signal strength vector at that representative location, is computed (process action 808). The representative location associated with the maximum locating quantity value is then designated as the current location of the person or object carrying the TX associated with the locating signal strength vector under consideration (process action 810). The procedure of process actions 806 and 808 is then repeated for each subsequently generated locating signal strength vector.

Using the Viterbi procedure along with the transition probabilities and observation probability function, an average location error of 3.05 meters was achieved (computed as the average Euclidian distances between the nodes identified using the technique and the node that the test subject carrying the TX was actually nearest at the time of each transmission from the TX). This constitutes a significant improvement over an average error of 4.57 meters computed for the nearest neighbor algorithm described previously. It is believed this improvement can be attributed to three factors. First, the graph limits paths to only those that are physically possible. Second, the transition probabilities encourage paths that conform to the a priori expectations of people's behavior. And finally, the Viterbi algorithm uses all the data up to and including the current time to compute the most likely current node, whereas the nearest neighbor technique uses only the current signal strength vector.

This last point is not obvious from Eq. (8), but the Viterbi algorithm implicitly re-optimizes the path at every time step. The procedure described in [3] shows how to maintain auxiliary variables that can be used to compute the complete path at every time step. However, this part of the procedure is not used in the present process because we are only interested in the current best node. However, it is the case that the best node computed at each time step by Eq. (8) may not end up being on the best path at subsequent time steps. At the expense of some delay, it may be possible to slightly improve the performance by waiting to compute the best node until a few more measurements have been recorded. In a test of this refinement, the accuracy of computing the nodes one at a time with Eq. (8) was compared to computing the single best path at the end of the walk through the space. The average error for the single best path was 2.81 meters, slightly better than 3.05 meters reported above.

A potentially useful byproduct of the Viterbi algorithm is $\delta_i(j)$, which is the probability of being at node j at time i given the data up to and include time i. In equation form $$\delta_i(j) = \underset{n_0, n_1, n_2, \ldots, n_{i-1}}{\max} P(n_0, n_1, \quad (9)$$
$$n_2, \ldots, n_{i-1}, n_i = j, s(t_0), s(t_1), s(t_2), \ldots, s(t_i))$$

Instead of reporting the single best estimate of the current node to a location-aware application, $\delta_i(j)$ could be used for reporting the probability of being at each node. If the uncertainty were too high, an application could defer taking certain actions or it could consult other sources of location information. Further, in some circumstances, even a low probability that the person or object being tracked is at some location, might be used to take or forego some action. For example, suppose that a company had a policy that calls or messages are not to be forwarded to someone in a conference room while a meeting is in progress. Thus, if there was even a low probability that the person being tracked is in a conference room where the locating system knows a meeting is being held, then the call or message would not be forwarded to the person.

5.0 Alternate Embodiments

While the invention has been described in detail by specific reference to embodiments thereof, it is understood that variations and modifications thereof may be made without departing from the true spirit and scope of the invention. For example, the roles of the TXs and RXs could be reversed such that the TXs are static and the RXs are carried by the person or object being tracked. In this alternate embodiment an RX would receive messages transmitted by a plurality of fixed-position TXs located in the space. The RX would be in communication (such as by a wireless LAN) with the centralized computer of the computer network and would forward data received from the TX transmissions via the network to the centralized computer, along with a value indicating the signal strength of each received TX transmission as measured by the RX. The process of locating the person or object of interest would then be the same as described previously, with the caveat that the transmitters are synchronized so as to not transmit at the same time, but within a prescribed period of time chosen to ensure that the person or object has not moved appreciably with the selected period. In this way there is no interference between the TX transmissions, while at the same time a transmission would be received from all the TXs while the person or object at interest is still at the same location in the space.

Still further, it would be possible for the foregoing mobile RXs to compute their location, without the need for the centralized computer. In this embodiment, each of the RXs would be pre-loaded with the calibration signal strength vector data, and would compute its location in the same way as the centralized computer would have if it where not eliminated from the system.

6.0 References

1. Hightower, J., G. Borriello, and R. Want, SpotOn: An Indoor 3D Location Sensing Technology Based on RF Signal Strength, UW-CSE 2000-02-02, University of Washington, 2000.
2. Bahl, P. and V. N. Padmanabhan. RADAR: *An In-Building RF-Based Location and Tracking System.* in *IEEE INFOCOM 2000.* 2000. Tel-Aviv, Israel.
3. Rabiner, L. R., *A Tutorial on Hidden Markov Models and Selected Applications in Speech Recognition.* Proceedings of the IEEE, 1989. 77(2): p. 257–285.
4. Bahl, P., V. N. Padmanabhan, and A. Balachandran, Enhancements to the RADAR User Location and Tracking System, MSR-TR-2000-12, Microsoft Research, 2000.
5. Castro, P., et al. *A Probabilistic Room Location Service for Wireless Networked Environments.* in *Ubicomp 2001.* 2001. Atlanta, Ga., USA: Springer.

Wherefore, what is claimed is:

1. A computer-implemented process for measuring the location of people and objects carrying radio frequency (RF) transmitters (TXs) that transmit messages to a plurality of RE receivers (RXs) located in a space each of which is in communication with a computer of a computer network, wherein each RX forwards data received from the TXs to the network via its associated computer, along with a value indicating the signal strength of the received TX transmission, the process comprising using a centralized computer of the network to perform the following process actions:

capturing data provided from the RXs which comprises the signal strength of each TX transmission measured by each RX associated with a TX carried by a person or object of interest within the space;

generating a locating signal strength vector representing the signal strength measured by each RX in response to the same TX transmission associated with the TX carried by the person or object of interest;

for each locating signal strength vector generated, comparing the locating vector to previously generated calibration signal strength vectors to determine what calibration vector is most likely to correspond to the locating vector based on any previous computed locations for the person or object being located and a prescribed set of allowable transitions between locations assigned to the calibration vectors, wherein each calibration signal strength vector represents what the signal strengths measured by each RX in response to a TX transmission would be if a TX is placed at said assigned locations in the space, and deeming the person or object being located to be at the location assigned to that calibration vector.

2. The process of claim 1, further comprising a process action of generating the calibration signal vectors prior to performing the action of comparing the locating vector to previously generated calibration signal strength vectors, said generating comprising the actions of:

storing a representation of a space in which the location of a person or object carrying a TX is to be measured, wherein the spatial representation comprises the coordinates and name of representative locations in the space where the person or object might be located at any point in time, capturing calibration data provided from the RXs which comprises the signal strength of each TX transmission measured by each RX when a TX is respectively placed at each of the representative locations in the space, and generating a calibration signal strength vector representing the signal strength measured by each RX in response to the same TX transmission and assigning the calibration vector to the representative location where the TX was placed when the transmission was made.

3. The process of claim 2, wherein the process action of capturing calibration data provided from the RXs which comprises the signal strength of each TX transmission measured by each RX when a TX is respectively placed at each of the representative locations in the space, comprises, for each representative location, the actions of:

inputting a message indicating that the TX is located at one of the representative locations and providing the name of the location;

capturing the calibration data provided from the RXs each time the TX transmits from the indicated representative location as the TX is reoriented at the location between TX transmissions and associating the calibration data with the indicated representative location; and inputting a message indicating that the TX is being removed from the currently indicated representative location and ceasing to associate any calibration data received with the currently indicated location.

4. The process of claim 2, wherein the spatial representation further comprises, for each of the representative locations, a set of transition probabilities representing said prescribed set of allowable transitions which specify the probability that a person or object of interest in the space would remain at the same location and the respective probabilities that the person or object would move to each of the other representative locations, between TX transmissions, wherein the probability of moving to another representative location that cannot be reached in the time between TX transmissions, owing to the distance between the locations or the presence of obstructions between the locations, is set to zero.

5. The process of claim 4, wherein the process action of comparing the locating vector to previously generated calibration signal strength vectors to determine what calibration vector is most likely to correspond to the locating vector for each locating signal strength vector generated and deeming the person or object of interest to be at the location assigned to that calibration vector, comprises the actions of:

upon the generation of the first locating signal strength vector, computing an initial locating quantity for each representative location which is defined as the product of the probability of starting at a representative location under consideration and the probability of measuring at that location the most current locating signal strength vector generated based on the calibration signal strength vectors generated for said location, and designating the location of the representative location associated with the maximum locating quantity computed as the current location of the person or object carrying the TX responsible for the locating signal strength vector;

upon generation of each subsequent locating signal strength vector, computing a locating quantity for each representative location which is defined as the maximum value of the respective products of the locating quantity computed for the immediately preceding locating signal strength vector generated for each representative location multiplied by the transition probability of transitioning from that location to the representative location under consideration multiplied by the probability of measuring the current locating signal strength vector at that representative location, designating the representative location associated with the maximum locating quantity value computed as the current location of the person or object carrying the TX associated with the locating signal strength vector under consideration.

6. The process of claim 5, wherein the process action of computing the locating quantity comprises an action of computing the probability of measuring the most current locating signal strength vector generated at a particular representative location based on the calibration signal strength vectors generated for that location, said computing of the probability comprising:

prescribing a value for the standard deviation of the signal strength readings within the space;

defining a covariance matrix $\Sigma$ as a 4×4 identity matrix scaled by the prescribed standard deviation of the signal strength readings;

computing the nearest neighbor calibration signal strength vector $s_n^*$ to the most current locating signal strength vector s as $$s_n^* = \min_{j=0...N_n-1} \|s - s_n^{(j)}\|$$

where $N_n$ is the number of calibration vectors at representative location n and $s_n^{(j)}$ are the calibration vectors assigned to location n; and defining the probability of measuring the most current locating signal strength vector generated at a particular representative location P(s|n) as $$P(s|n) = \frac{1}{\left(\sqrt{2\pi}\right)^4 |\Sigma|^{0.5}} e^{-\frac{1}{2}(s-s_n^*)^T \Sigma^{-1}(s-s_n^*)}.$$

7. The process of claim 5, further comprising the process action of reporting the locating quantity value computed for each representative location to a location-aware application, said location-aware application foregoing a prescribed action triggered by knowing the location of a person or object carrying a TX whenever the locating quantities when viewed as a whole indicated an uncertainty as to the location of the person or object of interest.

8. The process of claim 2, wherein the process action of comparing the locating vector to previously generated calibration signal strength vectors to determine what calibration vector is most likely to correspond to the locating vector for each locating signal strength vector generated and deeming the person or object of interest to be at the location assigned to that calibration vector, comprises the action of declaring the person or object of interest to be at the representative location associated with the calibration signal strength vector that is most similar to the locating signal strength vector.

9. The process of claim 8, wherein the process action of declaring the person or object of interest to be at the representative location associated with the calibration signal strength vector that is most similar to the locating signal strength vector, comprises the action of determining similarity between the calibration signal strength vectors and the locating signal strength vector using a nearest neighbor technique.

10. A location measurement system for measuring the location of persons and objects within a space, comprising:

at least one radio frequency (RF) transmitters (TX), each of which is carried by the person, or attached to the object, whose location is to be measured and each of which transmits TX messages;

a plurality of RF receivers (RXs), each of which receives TX messages transmitted by TXs within signal range of the RX, said TX messages comprising a transmitter identifier which uniquely identifies the particular TX transmitting the TX message, and wherein each RX measures the strength of the signal carrying a TX message received from a TX;

at least one computing device, each of which is in communication with one or more RXs and which receive data messages from the RXs which are generated upon receipt of a TX message from a TX, wherein the data message comprises the transmitter identifier, a signal strength indicator associated with the TX message and a receiver identifier that uniquely identifies the particular RX sending the data message;

a centralized computing device which is in communication with each of the computing devices associated with a RX via said network and which receives badge hit messages each of which represents a version of the forwarded RX data messages with an identifier identifying the computing device forwarding the message appended thereto; and a computer program comprising program modules executable by the centralized computing device, wherein the centralized computing device is directed by the program modules of the computer program to, generate a locating signal strength vector representing the signal strength measured by each RX in response to the same TX transmission associated with the TX carried by the person or object of interest within the space using the badge hit messages received via said network, and for each locating signal strength vector generated, compare the locating vector to previously generated calibration signal strength vectors to determine what calibration vector is most likely to correspond to the locating vector based on any previous computed locations for the person or object being located and a prescribed set of allowable transitions between locations assigned to the calibration vectors, and deeming the person or object of interest to be at a location assigned to that calibration vector, wherein each calibration signal strength vectors represents what the signal strengths measured by each RX in response to a TX transmission would be if a TX is placed at said assigned locations in the space.

11. The system of claim 10, further comprising a program module for generating the calibration signal strength vectors which is executed prior to executing the program module for comparing the locating vector to previously generated calibration signal strength vectors, said calibration signal strength vector generating program module comprising sub-modules for:

storing a representation of a space comprising the coordinates and name of representative locations in the space where the person or object might be located at any point in time;

capturing calibration data comprising the signal strength of each TX transmission measured by each RX when a TX is respectively placed at each of the representative locations in the space as derived from received badge hit messages; and generating a calibration signal strength vector representing the signal strength measured by each RX in response to the same TX transmission and assigning the calibration vector to the representative location where the TX was placed when the transmission was made.

12. The system of claim 11, further comprising a portable computing device which is in communication with the centralized computer via said network, and wherein the execution of the sub-module for storing the representation of the space is preceded by generating the spatial representation and transferring it to the centralized computer using said remote computer.

13. The system of claim 12, wherein the portable computing device comprises a graphical user interface including a display, user interface selection device and user interface data entry device, in addition to a computer program for generating said spatial representation comprising program modules executable by the portable computing device, wherein the portable computing device is directed by the program modules of the computer program to:

input a floor plan of the space;

display a calibration window on said display, said calibration window comprising a sector displaying the floor plan;

input a user-specified coordinate system used in defining locations in the space and their corresponding locations on the floor plan of the space;

input data and implement commands entered by the user using the calibration window via said selection and data entry devices to allow the user to specify the coordinates and name of said representative locations in the space;

respectively display a marker on the display of the floor plan at a location corresponding to the user-specified coordinates of each representative location entered by the user.

14. The system of claim 13, wherein the program module for inputting data and implementing commands entered by the user to specify the coordinates and name of said representative locations in the space, comprises a sub-module for inputting the coordinates and name of at least one representative location for each office or room in the space being calibrated, as well as the coordinates and name of a representative location in the hallways outside each office or room door.

15. The system of claim 13, wherein the program module for inputting data and implementing commands entered by the user to specify the coordinates and name of said representative locations in the space, comprises, for each location entered, executing sub-modules for:

inputting the coordinates of each representative location as the location in the space corresponding to a location on the displayed floor plan of the space that the user has identified by placing a screen cursor over the location and selecting it;

displaying the inputted coordinates in a position field appearing in the calibration window;

inputting a name entered by the user in a name field appearing in the calibration window and assigning the name to the representative location having the coordinates displayed in the position field at the time; and displaying a representative location marker on the floor plan at the floor plan location corresponding to the inputted coordinates of the location.

16. The system of claim 13, wherein the program module for inputting data and implementing commands entered by the user to specify the coordinates and name of said representative locations in the space, comprises, for each location entered, executing sub-modules for:

inputting the coordinates of each representative location as the location in the space corresponding to a location on the displayed floor plan of the space that the user has identified by placing a screen cursor over the location and selecting it;

displaying the inputted coordinates in a position field appearing in the calibration window;

generating a unique name for the representative location;

assigning the name to the representative location;

displaying the assigned name in a name field appearing in the calibration window; and displaying a representative location marker on the floor plan at the floor plan location corresponding to the inputted coordinates of the location.

17. The system of claim 13, further comprising a program module for inputting data and implementing commands entered by the user using the calibration window via said selection and data entry devices to allow the user to specify allowable paths between each representative location in the space and its adjacent representative locations, wherein an allowable path exists between a representative location and an adjacent representative location whenever a person or object carrying a TX could move from the representative location to the adjacent representative location in the time between transmissions of the TX.

18. The system of claim 17, wherein the program module for inputting data and implementing commands entered by the user to specify allowable paths between each representative location in the space and its adjacent representative locations, executing sub-modules for:

inputting, for each representative location, a list of transition probabilities representing said prescribed set of allowable transitions which specifies the probability that a person or object of interest in the space would remain at the same location and the respective probabilities that the person or object would move to each of the other representative locations, between TX transmissions, wherein the probability of moving to another representative location that cannot be reached in the time between TX transmissions, owing to the distance between the locations or the presence of obstructions between the locations, is set to zero;

for each non-zero transition probability specified between a pair of representative locations, displaying a line on the floor plan between the pair.

19. The system of claim 13, wherein the sub-module for capturing calibration data, comprises, for each representative location, the sub-modules for:

inputting a message generated by said portable computing device that indicates the TX is located at one of the representative locations and providing the name of the location;

capturing the calibration data provided from the RXs each time the TX transmits from the indicated representative location as the TX is reoriented at the location between TX transmissions and associating the calibration data with the indicated representative location; and inputting a message generated by said portable computing device that indicates the TX is being removed from the currently indicated representative location and ceasing to associate any calibration data received with the currently indicated location.

20. The system of claim 19, wherein the portable computing device further comprises a computer program for generating said messages indicating the TX is located at one of the representative locations and indicating the TX is being removed from the currently indicated representative location, said computer program comprising program modules executable by the portable computing device, wherein the portable computing device is directed by the program modules of the computer program to:

display a first button in the calibration window which when selected by the user causes the message indicating the TX is located at one of the representative locations to be provided to the centralized computer; and display a second button in the calibration window which when selected by the user causes the message indicating the TX is being removed from the currently indicated representative location to be provided to the centralized computer.

21. A computer-readable medium having computer-executable instructions for measuring the location of people and objects carrying radio frequency (RF) transmitters (TXs) that transmit messages to a plurality of RF receivers (RXs) located in a space each of which is in communication with a computer of a computer network, wherein each RX forwards data received from the TXs to the network via its associated computer, along with a value indicating the signal strength of the received TX transmission, said computer-executable instructions comprising:

in a calibration phase, storing a representation of a space in which the location of a person or object carrying a TX is to be measured, wherein the representation comprises the coordinates and name of representative locations in the space where the person or object might be located at any point in time, capturing calibration data provided from the RXs which comprises the signal strength of each TX transmission measured by each RX when a TX is respectively placed at each of the representative locations in the space, and generating a calibration signal strength vector representing the signal strength measured by each RX in response to the same TX transmission and assigning the calibration vector to the representative location where the TX was placed when the transmission was made; and in a locating phase, capturing data provided from the RXs which comprises the signal strength of each TX transmission measured by each RX associated with a TX carried by a person or object of interest within the space, generating a locating signal strength vector representing the signal strength measured by each RX in response to the same TX transmission associated with the TX carried by the person or object of interest, and for each locating signal strength vector generated, comparing the locating vector to the previously generated calibration signal strength vectors to determine what calibration vector is most likely to correspond to the locating vector based on any previous computed locations for the person or object being located and a prescribed set of allowable transitions between locations assigned to the calibration vectors, and deeming the person or object of interest to be at the location associated with that calibration vector.

22. A computer-implemented process for measuring the location of people and objects carrying radio frequency (RF) receivers (RXs) that receive messages transmitted by a plurality of RF transmitters (TXs) located in a space, wherein each RX is in communication with a centralized computer of a computer network and forwards data received from the TX transmissions via the network to said centralized computer, along with a value indicating the signal strength of each received TX transmission, the process comprising using a centralized computer of the network to perform the following process actions:

capturing data provided from the RXs which comprises the signal strength of each TX transmission measured by each RX associated with a person or object of interest within the space;

generating a locating signal strength vector representing the signal strengths measured by a RX carried by the person or object of interest in response to TX transmissions received within a prescribed period of time;

for each locating signal strength vector generated, comparing the locating vector to previously generated calibration signal strength vectors to determine what calibration vector is most likely to correspond to the locating vector based on any previous computed locations for the person or object of interest and a prescribed set of allowable transitions between locations assigned to the calibration vectors, wherein each calibration signal strength vectors represents what the signal strengths measured by the RX carried by the person or object of interest in response to TX transmissions received within a prescribed period of time would be if the RX is placed at said assigned locations in the space, and deeming the person or object being located to be at the location assigned to that calibration vector.

23. A computer-implemented process for measuring the location of people and objects carrying radio frequency (RF) receivers (RXs) that receive messages transmitted by a plurality of RF transmitters (TXs) located in a space, wherein each RX measures a value indicating the signal strength of each received TX transmission, the process comprising the following process actions:

generating a locating signal strength vector representing the signal strengths measured by a RX carried by the person or object of interest in response to TX transmissions received within a prescribed period of time;

for each locating signal strength vector generated, comparing the locating vector to previously generated calibration signal strength vectors to determine what calibration vector is most likely to correspond to the locating vector based on any previous computed locations for the person or object of interest and a prescribed set of allowable transitions between locations assigned to the calibration vectors and deeming the person or object being located to be at a location assigned to that calibration vector, wherein each calibration signal strength vectors represents what the signal strengths measured by the RX carried by the person or object of interest in response to TX transmissions received within a prescribed period of time would be if the RX is placed at said assigned locations in the space.

* * * * *